US008081149B2

(12) United States Patent
Natori et al.

(10) Patent No.: US 8,081,149 B2
(45) Date of Patent: Dec. 20, 2011

(54) INTEGRATED CIRCUIT DEVICE AND ELECTRONIC INSTRUMENT

(75) Inventors: Kanji Natori, Fujimi-machi (JP); Takashi Kumagai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 788 days.

(21) Appl. No.: 11/515,897

(22) Filed: Sep. 6, 2006

(65) Prior Publication Data

US 2007/0057896 A1 Mar. 15, 2007

(30) Foreign Application Priority Data

Sep. 9, 2005 (JP) ................................ 2005-262387

(51) Int. Cl.
*G09G 3/36* (2006.01)
*G06F 3/038* (2006.01)

(52) U.S. Cl. ........................................ 345/98; 345/204

(58) Field of Classification Search ............ 345/87–104, 345/204–205; 257/314–317, 371; 365/185.26, 365/185.29
See application file for complete search history.

(56) References Cited

U.S. PATENT DOCUMENTS

| | | | | |
|---|---|---|---|---|
| 4,935,790 A | | 6/1990 | Cappelletti et al. | |
| 5,388,055 A | * | 2/1995 | Tanizawa et al. | 716/9 |
| 5,774,106 A | * | 6/1998 | Nitta et al. | 345/98 |
| 6,064,585 A | * | 5/2000 | Mori et al. | 365/63 |
| 6,570,559 B1 | * | 5/2003 | Oshima | 345/204 |
| 2002/0011998 A1 | | 1/2002 | Tamura | |
| 2002/0126108 A1 | * | 9/2002 | Koyama et al. | 345/204 |
| 2004/0125093 A1 | * | 7/2004 | Rutman et al. | 345/204 |
| 2005/0098835 A1 | * | 5/2005 | Ushiroda et al. | 257/371 |
| 2005/0206585 A1 | * | 9/2005 | Stewart et al. | 345/34 |
| 2005/0212782 A1 | * | 9/2005 | Brunner | 345/204 |
| 2006/0267903 A1 | | 11/2006 | Kawase et al. | |

FOREIGN PATENT DOCUMENTS

| | | |
|---|---|---|
| JP | A 63-166274 | 7/1988 |
| JP | A 2001-222249 | 8/2001 |
| JP | A-2004-146806 | 5/2004 |
| JP | A-2006-330582 | 12/2006 |

OTHER PUBLICATIONS

U.S. Appl. No. 11/270,551, filed Nov. 10, 2005; Takashi Kumagai et al.
New U.S. Patent Application, Ref. No. 129325; Filed Sep. 6, 2006; Kanji Natori et al.

* cited by examiner

*Primary Examiner* — Lun-Yi Lao
*Assistant Examiner* — Kenneth Bukowski
(74) *Attorney, Agent, or Firm* — Oliff & Berridge, PLC

(57) ABSTRACT

An integrated circuit device includes first to Nth circuit blocks (N is an integer of two or more) disposed along the long side of the integrated circuit device. One circuit block of the first to Nth circuit blocks is a logic circuit block, and another circuit block of the first to Nth circuit blocks is a programmable ROM of which at least part of data stored therein can be programmed by a user. The logic circuit block and the programmable ROM block are adjacently disposed along a first direction. At least part of information stored in the programmable ROM block is supplied to the logic circuit block.

9 Claims, 20 Drawing Sheets

FIG. 2

| | WITH MEMORY (RAM) | | WITHOUT MEMORY | | CSTN | TFD |
|---|---|---|---|---|---|---|
| | AMORPHOUS TFT | LOW-TEMPERATURE POLYSILICON TFT | AMORPHOUS TFT | LOW-TEMPERATURE POLYSILICON TFT | | |
| MEMORY (RAM) | INCLUDE | INCLUDE | NOT INCLUDE | NOT INCLUDE | INCLUDE | INCLUDE |
| DATA DRIVER | INCLUDE | INCLUDE | INCLUDE | INCLUDE | INCLUDE | INCLUDE |
| SCAN DRIVER | INCLUDE | NOT INCLUDE | INCLUDE | NOT INCLUDE | INCLUDE | INCLUDE |
| LOGIC CIRCUIT (G/A) | INCLUDE | INCLUDE | INCLUDE | INCLUDE | INCLUDE | INCLUDE |
| GRAYSCALE VOLTAGE GENERATION CIRCUIT ($\gamma$) | INCLUDE | INCLUDE | INCLUDE | INCLUDE | NOT INCLUDE | NOT INCLUDE |
| POWER SUPPLY CIRCUIT | INCLUDE | INCLUDE | INCLUDE | INCLUDE | INCLUDE | INCLUDE |

AMPLITUDE ADJUSTMENT

SLOPE ADJUSTMENT

FINE ADJUSTMENT

INTEGRATED CIRCUIT DEVICE AND ELECTRONIC INSTRUMENT

Japanese Patent Application No. 2005-262387 filed on Sep. 9, 2005, is hereby incorporated by reference in its entirety.

BACKGROUND OF THE INVENTION

The present invention relates to an integrated circuit device and an electronic instrument.

A display driver (LCD driver) is known as an integrated circuit device which drives a display panel such as a liquid crystal panel. The display driver is required to have a reduced chip size in order to reduce cost.

On the other hand, a display panel incorporated in a portable telephone or the like has approximately the same size. Accordingly, when reducing the chip size by merely shrinking the integrated circuit device (display driver) using a microfabrication technology, it becomes difficult to mount the integrated circuit device.

When the user manufactures a display device by mounting a display driver on a liquid crystal panel, various adjustments are necessary for the display driver. For example, it is necessary to adjust the display driver conforming to the panel specification (e.g. amorphous TFT, low-temperature polysilicon TFT, QCIF, QVGA, or VGA) or drive conditions, or to adjust the display driver so that the display characteristics do not vary depending on the panel. It is also necessary for the IC manufacturer to adjust the oscillation frequency or the output voltage or to switch to a redundant memory during IC inspection.

In related-art technology, the user adjusts the display driver using an external electrically erasable programmable read only memory ($E^2$PROM) or an external trimmer resistor (variable resistor). The IC manufacturer switches to a redundant memory by blowing a fuse element provided in the integrated circuit device.

It is troublesome for the user to provide external parts, and a trimmer resistor is expensive, has a large size, and easily breaks. It is also troublesome for the IC manufacturer to blow a fuse element and then verify whether the integrated circuit device operates normally.

JP-A-63-166274 proposes a nonvolatile memory device which can be simply manufactured at low cost in comparison with a stacked-gate nonvolatile memory device which requires a two-layer gate. In this nonvolatile memory device, a control gate is formed of an N-type impurity region in a semiconductor layer, and a floating gate electrode is formed of a single-layer conductive layer such as a polysilicon layer (hereinafter may be called "single-layer-gate nonvolatile memory device"). The single-layer-gate nonvolatile memory device can be manufactured using a CMOS transistor process, since it is unnecessary to stack the gate electrodes.

SUMMARY

One aspect of the invention relates to an integrated circuit device comprising:

first to Nth circuit blocks (N is an integer of two or more) disposed along a first direction when a direction from a first side which is a short side of the integrated circuit device toward a third side opposite to the first side is a first direction and a direction from a second side which is a long side of the integrated circuit device toward a fourth side opposite to the second side is a second direction;

one circuit block of the first to Nth circuit blocks being a logic circuit block;

another circuit block of the first to Nth circuit blocks being a programmable ROM block of which at least part of data stored therein can be programmed by a user;

the logic circuit block and the programmable ROM block being adjacently disposed along the first direction; and at least part of information stored in the programmable ROM block being supplied to the logic circuit block.

Another aspect of the invention relates to an integrated circuit device comprising:

first to Nth circuit blocks (N is an integer of two or more) disposed along a first direction when a direction from a first side which is a short side of the integrated circuit device toward a third side opposite to the first side is a first direction and a direction from a second side which is a long side of the integrated circuit device toward a fourth side opposite to the second side is a second direction;

one circuit block of the first to Nth circuit blocks being a power supply circuit block;

another circuit block of the first to Nth circuit blocks being a programmable ROM of which at least part of data stored therein can be programmed by a user;

the power supply circuit block and the programmable ROM block being adjacently disposed along the first direction; and at least part of information stored in the programmable ROM block being supplied to the power supply circuit block.

BRIEF DESCRIPTION OF THE SEVERAL VIEWS OF THE DRAWING

FIG. 2 is a view illustrating examples of various types of display drivers and circuit blocks provided in the display drivers.

DETAILED DESCRIPTION OF THE EMBODIMENT

Figure 1:
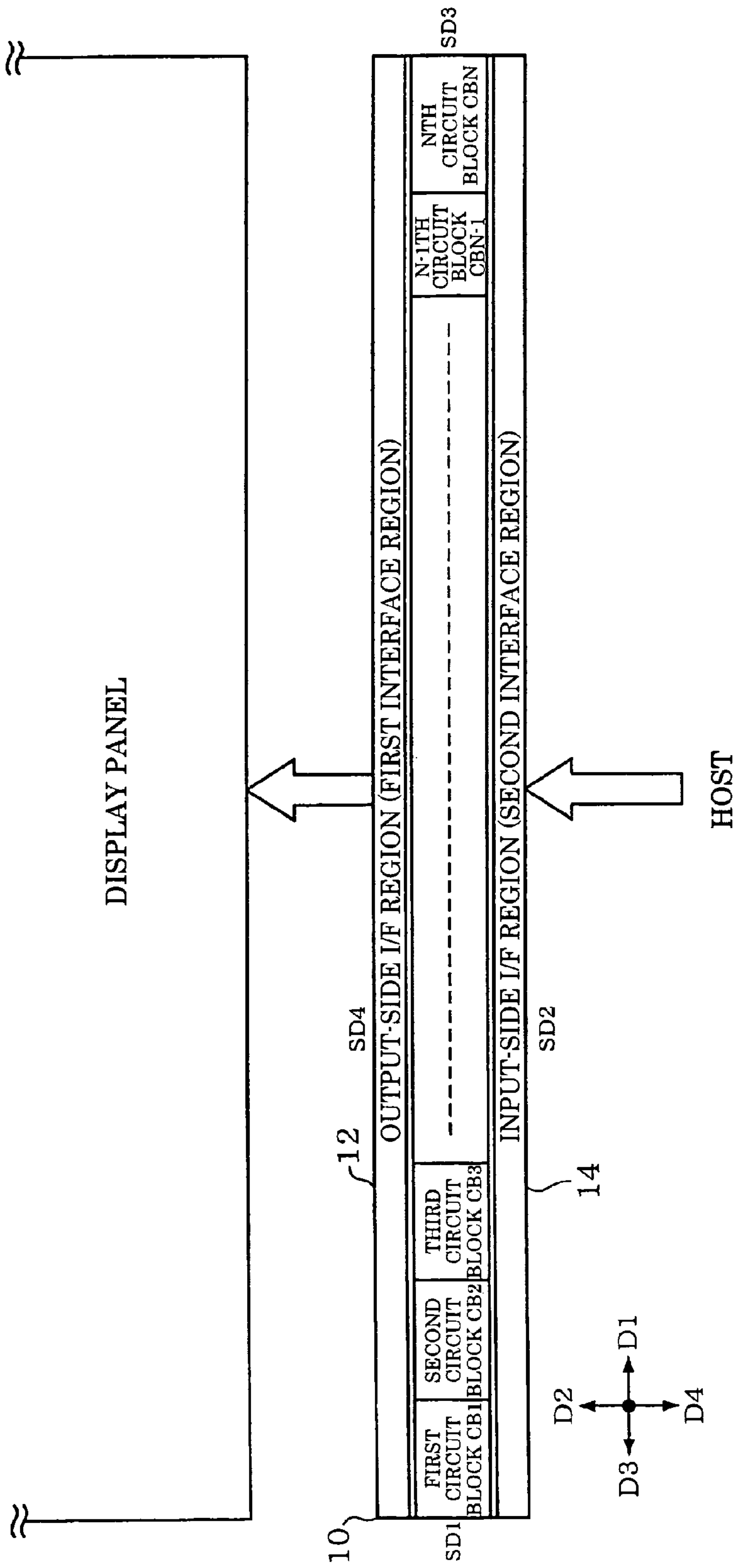
FIG. 1 is a view illustrating a configuration example of an integrated circuit device according to one embodiment of the invention.

The invention has been achieved in view of the above-described technical problems. An objective of the invention is to provide an integrated circuit device including a programmable ROM which makes it unnecessary to provide external parts and fuse elements, stores adjustment data mainly set by the user, and achieves a reduction in circuit area and an improvement in design efficiency, and an electronic instrument including the integrated circuit device.

One embodiment of the invention relates to an integrated circuit device comprising:

first to Nth circuit blocks (N is an integer of two or more) disposed along a first direction when a direction from a first side which is a short side of the integrated circuit device toward a third side opposite to the first side is a first direction and a direction from a second side which is a long side of the integrated circuit device toward a fourth side opposite to the second side is a second direction;

one circuit block of the first to Nth circuit blocks being a logic circuit block;

another circuit block of the first to Nth circuit blocks being a programmable ROM block of which at least part of data stored therein can be programmed by a user;

the logic circuit block and the programmable ROM block being adjacently disposed along the first direction; and at least part of information stored in the programmable ROM block being supplied to the logic circuit block.

In this embodiment of the invention, the first to Nth circuit blocks are disposed along the first direction, and include the logic circuit block and the programmable ROM block. The logic circuit block and the programmable ROM block are disposed along the first direction. This allows the width of the integrated circuit device in the second direction to be reduced in comparison with the case of disposing the logic circuit block and the programmable ROM block along the second direction. Specifically, an integrated circuit device which can be designed to have a narrow shape can be provided. External parts and fuse elements become unnecessary by storing adjustment data in the programmable ROM included in the first to Nth circuit blocks. Moreover, since signal lines from the programmable ROM block can be connected with the logic circuit block along a short path by adjacently disposing the logic circuit block and the programmable ROM block, whereby an increase in the chip area due to the wiring region can be prevented. In addition, even if the circuit configuration or the like is changed, other circuit blocks can be prevented from being affected by such a change, whereby the design efficiency can be improved.

In the integrated circuit device according to this embodiment, still another circuit block of the first to Nth circuit blocks may be a power supply circuit block;

the programmable ROM block may be disposed between the logic circuit block and the power supply circuit block;

the programmable ROM block and the power supply circuit block may be adjacently disposed along the first direction; and part of information stored in the programmable ROM block may be supplied to the power supply circuit block.

This allows signal lines from the programmable ROM to be connected with the power supply circuit block along a short path, whereby an increase in the chip area due to the wiring region can be prevented.

Another embodiment of the invention relates to an integrated circuit device comprising:

first to Nth circuit blocks (N is an integer of two or more) disposed along a first direction when a direction from a first side which is a short side of the integrated circuit device toward a third side opposite to the first side is a first direction and a direction from a second side which is a long side of the integrated circuit device toward a fourth side opposite to the second side is a second direction;

one circuit block of the first to Nth circuit blocks being a power supply circuit block;

another circuit block of the first to Nth circuit blocks being a programmable ROM of which at least part of data stored therein can be programmed by a user;

the power supply circuit block and the programmable ROM block being adjacently disposed along the first direction; and at least part of information stored in the programmable ROM block being supplied to the power supply circuit block.

In this embodiment of the invention, the first to Nth circuit blocks are disposed along the first direction, and include the power supply circuit block and the programmable ROM block. The power supply circuit block and the programmable ROM block are disposed along the first direction. This allows the width of the integrated circuit device in the second direction to be reduced in comparison with the case of disposing the power supply circuit block and the programmable ROM block along the second direction. Specifically, an integrated circuit device which can be designed to have a narrow shape can be provided. External parts and fuse elements become unnecessary by storing adjustment data in the programmable ROM included in the first to Nth circuit blocks. Moreover, since signal lines from the programmable ROM block can be connected with the power supply circuit block along a short path by adjacently disposing the power supply circuit block and the programmable ROM block, whereby an increase in the chip area due to the wiring region can be prevented. In addition, even if the circuit configuration or the like is changed, other circuit blocks can be prevented from being affected by such a change, whereby the design efficiency can be improved.

In the integrated circuit device according to the embodiments of the invention, the programmable ROM block may include:

a memory cell array block in which a plurality of memory cells storing data are arranged; and a control circuit block which controls reading of data from the memory cells.

In the integrated circuit device according to the embodiments of the invention, each of the memory cells may include a floating gate used in common as gates of a write/read transistor and an erase transistor formed on a semiconductor substrate, and may have single-layer-gate structure in which the floating gate is opposite to a control gate formed of an impurity layer provided in the semiconductor substrate through an insulating layer.

By separately providing the erase transistor and the write/read transistor in this manner, tolerance to a relatively high erase voltage can be increased in comparison with the case of erasing, writing, and reading data using a single transistor.

In the integrated circuit device according to the embodiments of the invention, a well region in which the memory cells are formed may have a triple-well structure; and when the semiconductor substrate is a first conductivity type, the well region may include a deep well of a second conductivity type formed in the semiconductor substrate, a shallow well of the first conductivity type formed on the deep well of the second conductivity type, a ring-shaped shallow well of the second conductivity type which encloses the shallow well of the first conductivity type on the deep well of the second conductivity type, and a top impurity region formed in the shallow well of the first conductivity type and the ring-shaped shallow well of the second conductivity type.

The shallow well of the first conductivity type can be electrically separated from the semiconductor substrate by enclosing the shallow well of the first conductivity type with the ring-shaped shallow well of the second conductivity type and disposing the deep well of the second conductivity type in the lower layer of these wells, whereby the shallow well of the first conductivity type and the semiconductor substrate can be set at different potentials.

In the integrated circuit device according to the embodiments of the invention, a bitline connected with the memory cells may extend in the programmable ROM block along the first direction; and a wordline connected with the memory cells may extend in the programmable ROM block along the second direction.

According to this feature, since the wordline connected with the memory cells extends along the short side direction (second direction) of the integrated circuit device, the storage capacity of the programmable ROM can be increased by increasing the number of wordlines along the long side direction (first direction). Specifically, the storage capacity of the programmable ROM can be increased without increasing the size of the integrated circuit device in the short side direction (second direction). This allows the width of the integrated circuit device in the second direction to be reduced, whereby a narrow integrated circuit device can be provided. Since the bitline extends along the long side direction (first direction), the data is output along the first direction. Therefore, data signals can be easily supplied to other circuit blocks disposed along the first direction. Therefore, adjustment data can be supplied to other circuit blocks along a short path without providing interconnects along a roundabout path.

In the integrated circuit device according to the embodiments of the invention, the control circuit block and the memory cell array block may be adjacently disposed along the first direction.

According to this feature, since the data is output along the first direction, data signals can be easily supplied to other circuit blocks disposed along the first direction. Therefore, adjustment data can be supplied to other circuit blocks along a short path without providing interconnects along a roundabout path.

In the integrated circuit device according to the embodiments of the invention, the control circuit block may be disposed adjacent to the logic circuit block between the logic circuit block and the memory cell array block.

This allows data from the programmable ROM block to be supplied to the logic circuit block along a short path without providing interconnects along a roundabout path.

In the integrated circuit device according to the embodiments of the invention, the control circuit block may be disposed adjacent to the power supply circuit block between the power supply circuit block and the memory cell array block.

This allows data from the programmable ROM block to be supplied to the power supply circuit block along a short path without providing interconnects along a roundabout path.

In the integrated circuit device according to the embodiments of the invention, the integrated circuit device may be a display driver; and data stored in the programmable ROM block may be display driver adjustment data necessary for adjusting the display driver.

In the integrated circuit device according to the embodiments of the invention, the display driver adjustment data may be adjustment data for adjusting a panel voltage.

In the integrated circuit device according to the embodiments of the invention, the first to Nth circuit blocks may further include a grayscale voltage generation circuit block; and the display driver adjustment data may be adjustment data for adjusting the grayscale voltage.

In the integrated circuit device according to the embodiments of the invention, the display driver adjustment data may be adjustment data for adjusting a given timing.

In the integrated circuit device according to the embodiments of the invention, the display driver adjustment data may be adjustment data for adjusting start sequence setting of the integrated circuit device.

The integrated circuit device according to the embodiments of the invention may comprise:

a first interface region disposed on the second direction side of the first to Nth circuit blocks and extending along the fourth side; and a second interface region disposed on the side of the first to Nth circuit blocks opposite to the second direction and extending along the second side.

A further embodiment of the invention relates to an electronic instrument comprising:

the above integrated circuit device; and a display panel driven by the integrated circuit device.

Preferred embodiments of the invention are described below in detail. Note that the embodiments described hereunder do not in any way limit the scope of the invention defined by the claims laid out herein. Note that all elements of the embodiments described below should not necessarily be taken as essential requirements for the invention.

1. Configuration of Integrated Circuit Device

FIG. 1 illustrates a configuration example of an integrated circuit device 10 according to this embodiment. In this embodiment, the direction from a first side SD1 (short side) of the integrated circuit device 10 toward a third side SD3 opposite to the first side SD1 is defined as a first direction D1, and the direction opposite to the first direction D1 is defined as a third direction D3. The direction from a second side SD2 (long side) of the integrated circuit device 10 toward a fourth side SD4 opposite to the second side SD2 is defined as a second direction D2, and the direction opposite to the second direction D2 is defined as a fourth direction D4. In FIG. 1, the left side of the integrated circuit device 10 is the first side SD1, and the right side is the third side SD3. Note that the left side may be the third side SD3, and the right side may be the first side SD1.

As shown in FIG. 1, the integrated circuit device 10 according to this embodiment includes first to Nth circuit blocks CB1 to CBN (N is an integer of two or more) disposed along the direction D1 (along the long side of the integrated circuit device 10). In this embodiment, the circuit blocks CB1 to CBN are arranged along the direction D1. The details of the first to Nth circuit blocks CB1 to CBN are described later.

The integrated circuit device 10 also includes an output-side I/F region 12 (first interface region in a broad sense) provided along the side SD4 on the direction D2 side of the first to Nth circuit blocks CB1 to CBN. The integrated circuit device 10 also includes an input-side I/F region 14 (second interface region in a broad sense) provided along the side SD2 on the direction D4 side (opposite to the second direction side) of the first to Nth circuit blocks CB1 to CBN. In more detail, the output-side I/F region 12 (first interface region) is disposed on the direction D2 side of the circuit blocks CB1 to CBN without another circuit block or the like interposed therebetween, for example. The input-side I/F region 14 (second interface region) is disposed on the direction D4 side of the circuit blocks CB1 to CBN without another circuit block or the like interposed therebetween, for example. When the integrated circuit device 10 is used as an intellectual property (IP) core and incorporated into another integrated circuit device, at least one of the I/F regions 12 and 14 may be omitted from the integrated circuit device 10.

The output-side (display panel side) I/F region 12 is a region which serves as an interface between the integrated circuit device 10 and the display panel, and includes pads and various elements connected with the pads, such as output transistors and protective elements. When the display panel is a touch panel or the like, the output-side I/F region 12 may include input transistors.

The input-side I/F (host side) region 14 is a region which serves as an interface between the integrated circuit device 10 and a host (MPU, image processing controller, or baseband engine), and may include pads and various elements connected with the pads, such as input (input/output) transistors, output transistors, and protective elements.

An output-side or input-side I/F region may be provided along the short side SD1 or SD3.

The first to Nth circuit blocks CB1 to CBN may include at least two (or three) different circuit blocks (circuit blocks having different functions). In this embodiment in which the integrated circuit device 10 is a display driver, a programmable ROM block and at least one of a logic circuit block (gate array block in a broad sense) and a power supply circuit block, which the destinations of data from the programmable ROM block, are indispensable.

FIG. 2 illustrates examples of various types of display drivers and circuit blocks provided in the display drivers. In an amorphous thin film transistor (TFT) panel display driver including a memory (RAM), the circuit blocks CB1 to CBN include a display memory block, a data driver (source driver) block, a scan driver (gate driver) block, a logic circuit (gate array circuit) block, a grayscale voltage generation circuit (gamma correction circuit) block, and a power supply circuit block in addition to the programmable ROM block. In a low-temperature polysilicon (LTPS) TFT panel display driver including a memory, since the scan driver can be formed on a glass substrate, the scan driver block may be omitted. The memory block may be omitted in an amorphous TFT panel display driver which does not include a memory, and the memory block and the scan driver block may be omitted in a low-temperature polysilicon TFT panel display driver which does not include a memory. In a color super twisted nematic (CSTN) panel display driver and a thin film diode (TFD) panel display driver, the grayscale voltage generation circuit block may be omitted.

Figure 3A:
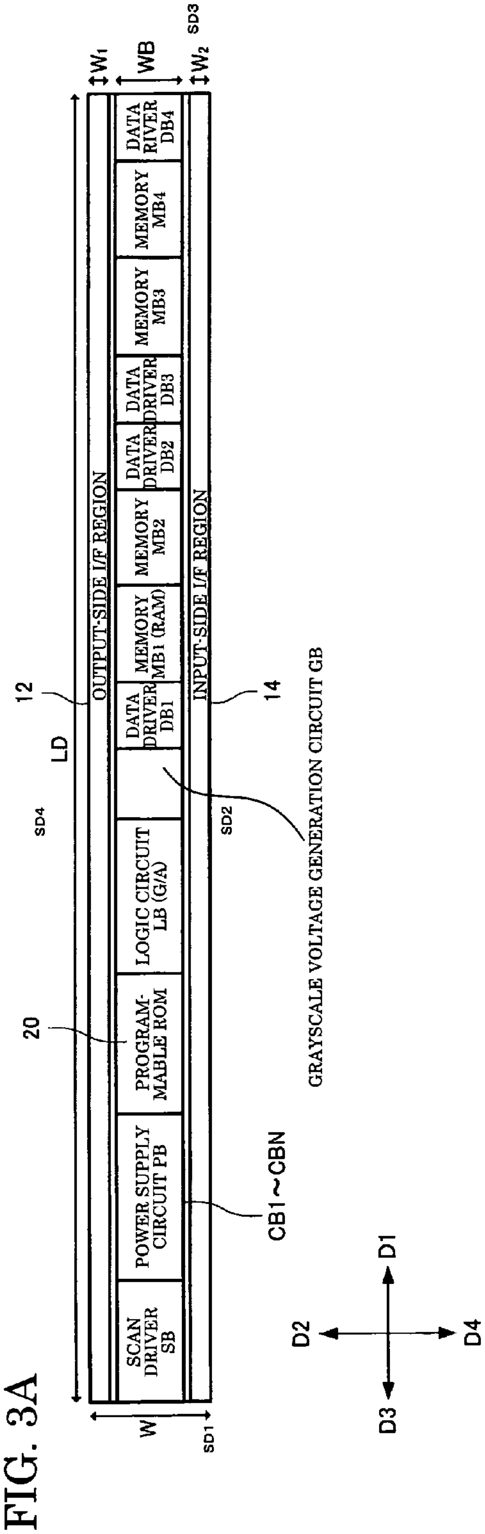
FIGS. 3A and 3B are views illustrating planar layout examples of an integrated circuit device according to one embodiment of the invention.
Figure 3B:
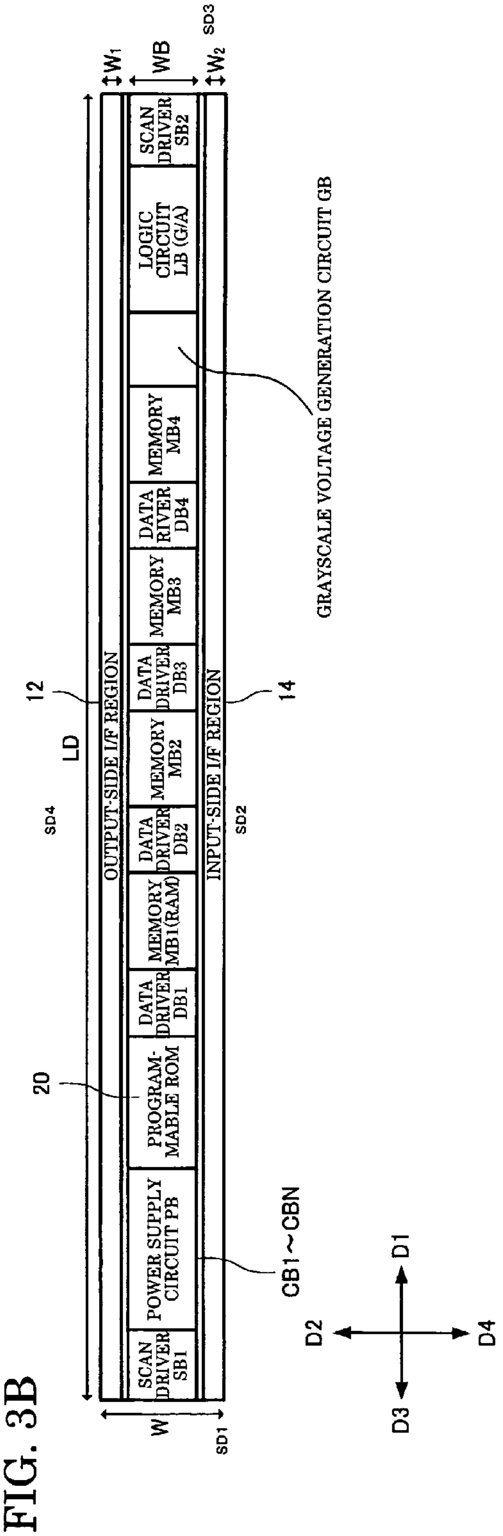

FIGS. 3A and 3B illustrate examples of the planar layout of the integrated circuit device 10 (display driver) according to this embodiment. FIGS. 3A and 3B illustrate examples of an amorphous TFT panel display driver including a memory. FIG. 3A aims at a QCIF 32-grayscale display driver, and FIG. 3B aims at a QVGA 64-grayscale display driver.

In FIG. 3A, a programmable ROM 20 is provided between a power supply circuit PB and a logic circuit LB. In other words, the programmable ROM 20 is adjacent to the blocks of the power supply circuit PB and the logic circuit LB along the direction D1. When focusing on the individual circuit blocks, the logic circuit block LB and the programmable ROM 20 are adjacently disposed along the first direction (along the long side of the integrated circuit device 10), and the power supply circuit block PB and the programmable ROM 20 are disposed along the first direction (along the long side of the integrated circuit device 10).

In FIG. 3B, the programmable ROM 20 is adjacent to the power supply circuit PB block along the direction D1.

This is because the power supply circuit PB and/or the logic circuit LB is the main destination of data read from the programmable ROM 20. Specifically, data from the programmable ROM 20 can be supplied to the power supply circuit PB and/or the logic circuit LB along a short path. Therefore, it is obvious that the arrangement of the programmable ROM 20 according to the invention is not limited to the above arrangements. Specifically, according to the invention, the programmable ROM 20 may be disposed on either side of the power supply circuit PB along the long side of the integrated circuit device 10. The programmable ROM 20 may also be disposed on either side of the logic circuit block LB along the long side of the integrated circuit device 10. As a modification of this embodiment, the programmable ROM 20 may be disposed between the scan driver SB1 and the power supply circuit PB in FIG. 3B. Or, the programmable ROM 20 may be disposed between the logic circuit block LB and the scan driver SB2 in FIG. 3B. The data read from the programmable ROM 20 is described later.

In FIGS. 3A and 3B, the circuit blocks CB1 to CBN include memory blocks MB1 to MB4 which store display data, data driver blocks DB1 to DB4 disposed adjacent to each memory, a grayscale voltage generation circuit block GB, and one or two scan driver blocks SB (or SB1 and SB2) in addition to the above three blocks.

The layout arrangement shown in FIG. 3A has an advantage in that a column address decoder can be used in common between the memory blocks MB1 and MB2 or the memory blocks MB3 and MB4. The layout arrangement shown in FIG. 3B has an advantage in that the wiring pitch of data signal output lines from the data driver blocks DB1 to DB4 to the output-side I/F region 12 can be equalized, whereby the wiring efficiency can be increased.

The layout arrangement of the integrated circuit device 10 according to this embodiment is not limited to those shown in FIGS. 3A and 3B insofar as the programmable ROM 20 is adjacent to the logic circuit block LB and/or the power supply circuit block PB along the first direction D1. A circuit block with a significantly small width in the direction D2 (narrow circuit block with a width equal to or less than the width WB) may be provided between the circuit blocks CB1 to CBN and the output-side I/F region 12 or the input-side I/F region 14. The circuit blocks CB1 to CBN may include a circuit block in which circuit blocks are arranged in stages along the direction D2. For example, the scan driver circuit and the power supply circuit may be integrated into one circuit block.

Figure 4A:
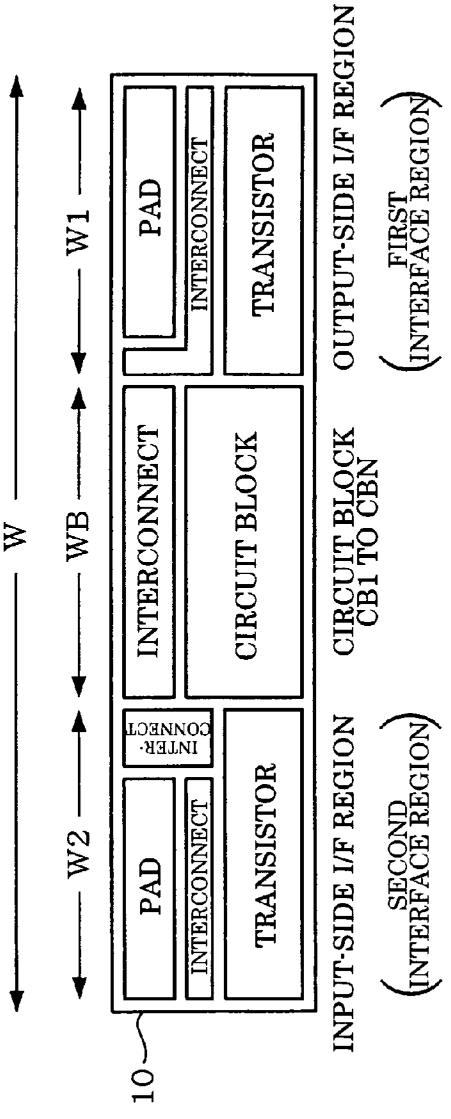
FIGS. 4A and 4B are views illustrating examples of a cross-sectional view of an integrated circuit device.

FIG. 4A illustrates an example of a cross-sectional view of the integrated circuit device 10 according to this embodiment along the direction D2. W1, WB, and W2 respectively indicate the widths of the output-side I/F region 12, the circuit blocks CB1 to CBN, and the input-side I/F region 14 in the direction D2. W indicates the width of the integrated circuit device 10 in the direction D2.

In this embodiment, as shown in FIG. 4A, a configuration can be achieved in which another circuit block is not provided between the circuit blocks CB1 to CBN and the output-side and input-side I/F regions 12 and 14 along the direction D2. Therefore, the relationship $W1+WB+W2 \leqq W < W1+2\times WB+W2$ is satisfied, whereby a narrow integrated circuit device can be realized. In more detail, the width W in the direction D2 may be set at $W<2$ mm. More specifically, the width W in the direction D2 may be set at $W<1.5$ mm. It is preferable that $W>0.9$ mm taking inspection and mounting of the chip into consideration. The length LD (see FIGS. 3A and 3B) in the long side direction may be set at 15 mm$<LD<$27 mm. A chip shape ratio $SP=LD/W$ may be set at $SP>10$. More specifically, the chip shape ratio SP may be set at $SP>12$.

The widths of the circuit blocks CB1 to CBN in the direction D2 may be identical, for example. In this case, it suffices that the width of each circuit block be substantially identical. The width of each circuit block may differ in the range of several to 20 μm (several tens of micrometers), for example. When a circuit block with a different width exists in the circuit blocks CB1 to CBN, the width WB may be the maximum width of the circuit blocks CB1 to CBN.

Figure 4B:
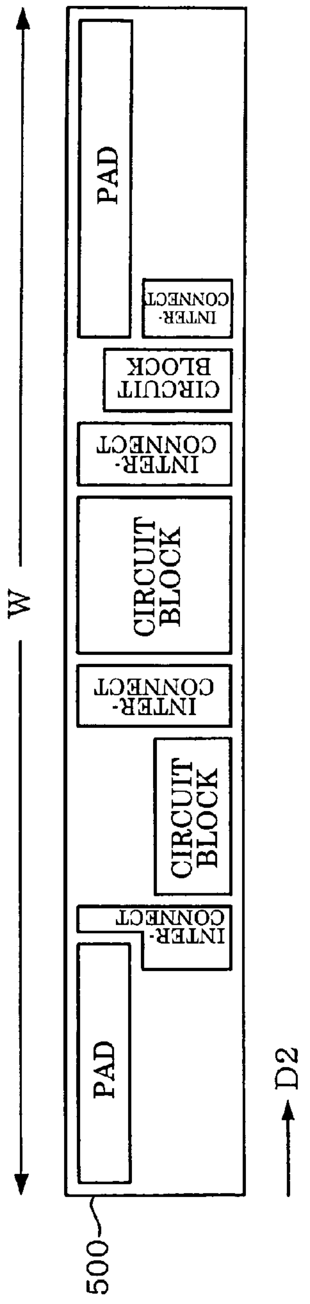

FIG. 4B illustrates a comparative example in which two or more circuit blocks are disposed along the direction D2. A wiring region is formed between the circuit blocks or between the circuit block and the I/F region in the direction D2. Therefore, since the width W of an integrated circuit device 500 in the direction D2 (short side direction) is increased, a narrow chip cannot be realized. Therefore, even if the chip is shrunk by using a microfabrication technology, the length LD in the direction D1 (long side direction) is decreased, whereby the output pitch becomes narrow. As a result, it becomes difficult to mount the integrated circuit device.

In this embodiment, the circuit blocks CB1 to CBN are disposed along the direction D1, as shown in FIG. 1. As shown in FIG. 4A, a transistor (circuit element) can be disposed under the pad (bump) (active surface bump). Moreover, a signal line can be formed between the circuit blocks or between the circuit block and the I/F region using a global line formed in the upper layer (lower layer of the pad) of local lines which are lines in the circuit blocks. Therefore, the width W in the direction D2 can be reduced while maintaining the length LD of the integrated circuit device 10 in the direction D1, whereby a narrow chip can be realized. As a result, the output pitch can be maintained at 22 μm or more, for example, whereby mounting can be facilitated.

In this embodiment, since the circuit blocks CB1 to CBN are disposed along the direction D1, it is possible to easily deal with a change in the product specification and the like. Specifically, since products of various specifications can be designed using a common platform, the design efficiency can be improved. In FIGS. 3A and 3B, when the number of pixels or the number of grayscales of the display panel is increased or decreased, it is possible to deal with such a situation by merely increasing or decreasing the number of memory blocks or data driver blocks, the number of readings of image data in one horizontal scan period, or the like. FIGS. 3A and 3B illustrate examples of an amorphous TFT panel display driver including a memory. When developing a low-temperature polysilicon TFT panel display driver including a memory, it suffices to remove the scan driver block from the circuit blocks CB1 to CBN. When developing a product which does not include a memory, it suffices to remove the memory block. In this embodiment, even if the circuit block is removed corresponding to the specification, since the effects of removal on the remaining circuit blocks are minimized, the design efficiency can be improved.

In this embodiment, the widths (heights) of the circuit blocks CB1 to CBN in the direction D2 can be adjusted to the width (height) of the data driver block or the memory block, for example. When the number of transistors of each circuit block is increased or decreased, since it is possible to deal with such a situation by increasing or decreasing the length of each circuit block in the direction D1, the design efficiency can be further improved. For example, when the number of transistors of each circuit block is increased or decreased in FIGS. 3A and 3B due to a change in the configuration of the grayscale voltage generation circuit block or the power supply circuit block, it is possible to deal with such a situation by increasing or decreasing the length of the grayscale voltage generation circuit block or the power supply circuit block in the direction D1.

2. Data of Programmable ROM 2.1. Grayscale Voltage Data

In the integrated circuit device according to this embodiment, data stored in the programmable ROM 20 may be adjustment data for adjusting a grayscale voltage. The grayscale voltage generation circuit (gamma correction circuit) generates the grayscale voltage based on the adjustment data stored in the programmable ROM 20. The operation of the grayscale voltage generation circuit (gamma correction circuit) is described below.

Figure 5:
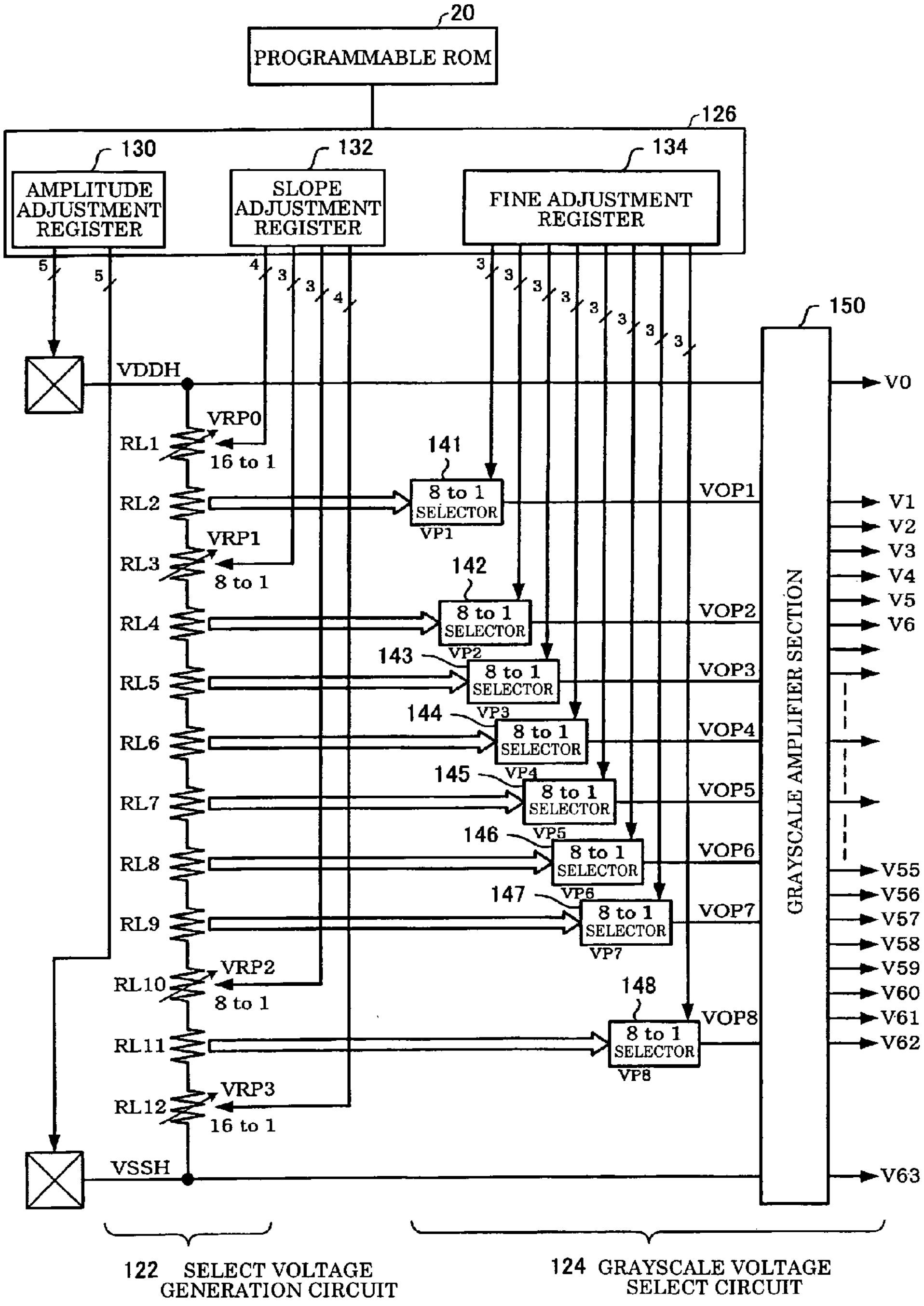
FIG. 5 is a block diagram illustrating the relationship among a programmable ROM, a logic circuit, and a grayscale voltage generation circuit among the circuit blocks shown in FIG. 3A.

FIG. 5 illustrates the programmable ROM 20, the logic circuit LB, and the grayscale voltage generation circuit (gamma correction circuit) GB among the circuit blocks shown in FIG. 3A.

The adjustment data for adjusting the grayscale voltage is input to the programmable ROM 20 by the user (display device manufacturer), for example. An adjustment register 126 is provided in the logic circuit LB. Various types of setting data which can adjust the grayscale voltage may be set in the adjustment register 126. The setting data is output by reading the adjustment data stored in the programmable ROM 20 into the adjustment register 126. The setting data read from the adjustment register 126 is supplied to the grayscale voltage generation circuit GB.

The grayscale voltage generation circuit GB includes a select voltage generation circuit 122 and a grayscale voltage select circuit 124. The select voltage generation circuit 122 (voltage divider circuit) outputs select voltages based on high-voltage power supply voltages VDDH and VSSH generated by the power supply circuit PB. In more detail, the select voltage generation circuit 122 includes a ladder resistor circuit including a plurality of resistor elements connected in series. The select voltage generation circuit 122 outputs voltages obtained by dividing the power supply voltages VDDH and VSSH using the ladder resistor circuit as the select voltages. When the number of grayscales is 64, the grayscale voltage select circuit 124 selects 64 voltages from the select voltages based on grayscale characteristic setting data supplied from the adjustment register 126, and outputs the selected voltages as grayscale voltages V0 to V63. This allows generation of grayscale voltages with grayscale characteristics (gamma correction characteristics) optimum for the display panel.

The adjustment register 126 may include an amplitude adjustment register 130, a slope adjustment register 132, and a fine adjustment register 134. The grayscale characteristic data is set in the amplitude adjustment register 130, the slope adjustment register 132, and the fine adjustment register 134.

Figure 6A:
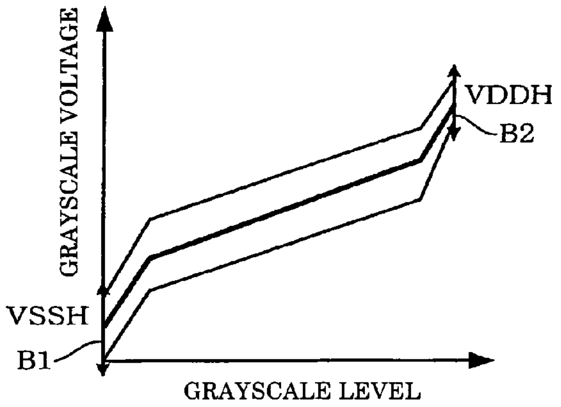
FIGS. 6A, 6B, and 6C are characteristic diagrams illustrating a grayscale voltage adjusted using the circuits in FIG. 5.

For example, the levels of the power supply voltages VDDH and VSSH are changed, as indicated by B1 and B2 in FIG. 6A, by reading the 5-bit setting data stored in the programmable ROM 20 into the amplitude adjustment register 130, whereby the amplitude of the grayscale voltage can be adjusted.

Figure 6B:
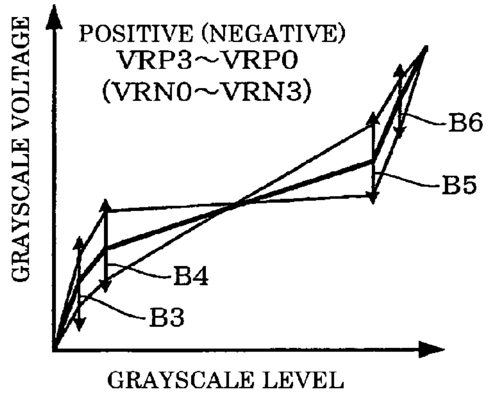

The grayscale voltage is changed at four points of the grayscale level, as indicated by B3 to B6 in FIG. 6B, by reading the setting data stored in the programmable ROM 20 into the slope adjustment register 132, whereby the slope of the grayscale characteristics can be adjusted. Specifically, the resistances of resistor elements RL1, RL3, RL10, and RL12 forming the resistance ladder are changed based on 4-bit setting data VRP0 to VRP3 set in the slope adjustment register 132, whereby the slope can be adjusted as indicated by B3.

Figure 6C:
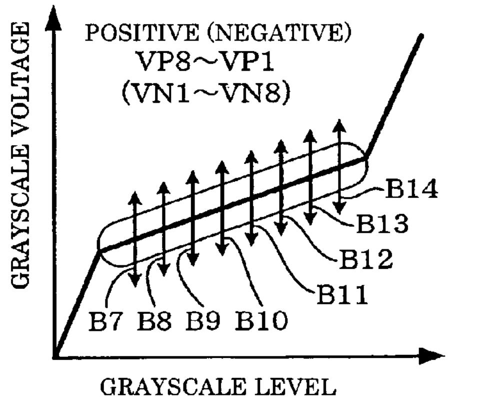

The grayscale voltage is changed at eight points of the grayscale level, as indicated by B7 to B14 in FIG. 6C, by reading the setting data stored in the programmable ROM 20 into the fine adjustment register 134, whereby the grayscale characteristics can be finely adjusted. Specifically, 8-to-1 selectors 141 to 148 respectively select one of eight taps of each of eight resistor elements RL2, RL4 to RL9, and RL11 based on 3-bit setting data VP1 to VP8 set in the fine adjustment register 134, and output the voltage of the selected taps as outputs VOP1 to VOP8. This enables fine adjustment as indicated by B7 to B14 in FIG. 6C.

A grayscale amplifier section 150 outputs the grayscale voltages V0 to V63 based on the outputs VOP1 to VOP8 from the 8-to-1 selectors 142 to 148 and the power supply voltages VDDH and VSSH. In more detail, the grayscale amplifier section 150 includes first to eighth impedance conversion circuits (voltage-follower-connected operational amplifiers) to which the outputs VOP1 to VPOP8 are input. The grayscale voltages V1 to V62 are generated by dividing the output voltages of adjacent impedance conversion circuits of the first to eighth impedance conversion circuits using resistors, for example.

The grayscale characteristics (gamma characteristics) optimum for each type of display panel can be obtained by the above-described adjustment, whereby the display quality can be improved. In this embodiment, the adjustment data for obtaining grayscale characteristics (gamma characteristics) optimum for each type of display panel is stored in the programmable ROM 20. Therefore, grayscale characteristics (gamma characteristics) optimum for each type of display panel can be obtained, whereby the display quality can be improved.

In this embodiment, the programmable ROM 20 and the logic circuit block LB are adjacently disposed along the first direction D1. This allows adjustment data signal lines from the programmable ROM 20 to be connected with the logic circuit block LB along a short path, whereby an increase in the chip area due to the wiring region can be prevented.

In this embodiment, the logic circuit block LB and the grayscale voltage generation circuit block GB may be adjacently disposed along the direction D1, as shown in FIG. 3A. This allows signal lines from the logic circuit block LB to be connected with the grayscale voltage generation circuit block GB along a short path, whereby an increase in the chip area due to the wiring region can be prevented.

2.2. Panel Setting Voltage Data

In the integrated circuit device according to this embodiment, the data stored in the programmable ROM 20 may be adjustment data for adjusting a panel voltage. The adjustment data for adjusting the panel voltage may be data for adjusting a voltage applied to a common electrode VCOM, for example.

Figure 7:
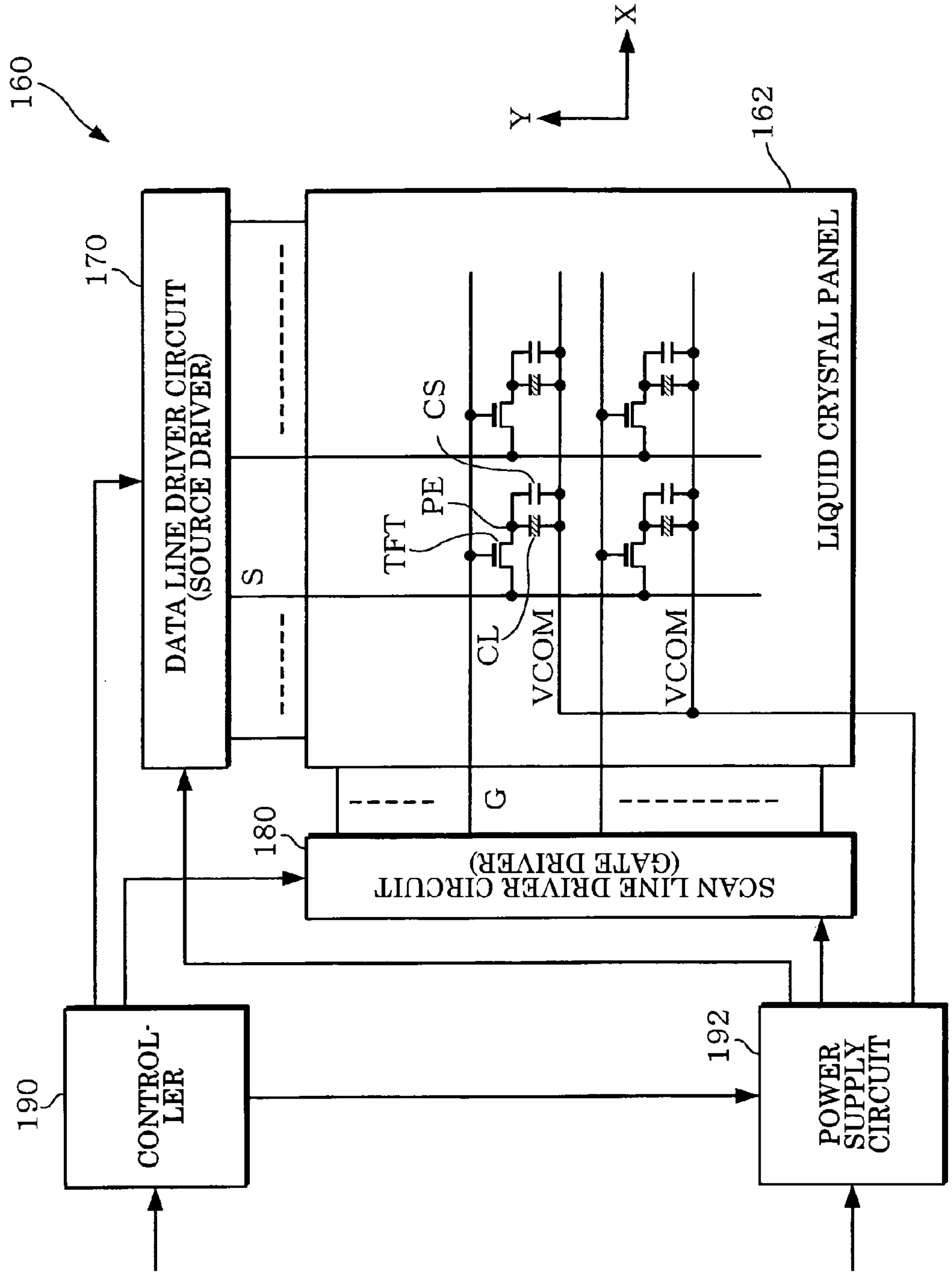
FIG. 7 is a block diagram of a configuration example of a display device including an electro-optical device.

FIG. 7 is a block diagram of a configuration example of a display device including an electro-optical device. The display device shown in FIG. 7 realizes a function of a liquid crystal device. The electro-optical device realizes a function of a liquid crystal panel.

A liquid crystal device 160 (display device in a broad sense) includes a liquid crystal panel (display panel in a broad sense) 162 using a thin film transistor (TFT) as a switching element, a data line driver circuit 170, a scan line driver circuit 180, a controller 190, and a power supply circuit 192.

A gate electrode of the TFT is connected with a scan line G, a source electrode of the TFT is connected with a data line S, and a drain electrode of the TFT is connected with a pixel electrode PE. A liquid crystal capacitor CL (liquid crystal element) and a storage capacitor CS are formed between the pixel electrode PE and a common electrode VCOM opposite to the pixel electrode PE through a liquid crystal element (electro-optical substance in a broad sense). A liquid crystal is sealed between an active matrix substrate, on which the TFT, the pixel electrode PE, and the like are formed, and a common substrate, on which the common electrode VCOM is formed. The transmissivity of the pixel changes corresponding to the voltage applied between the pixel electrode PE and the common electrode VCOM.

In this embodiment, adjustment data for adjusting the voltage applied to the common electrode VCOM may be stored in the programmable ROM 20. The voltage generated by the power supply circuit 192 is adjusted based on the adjustment data, and the adjusted voltage is applied to the common electrode VCOM. The display quality can be improved by setting the adjustment data for each display panel.

In this embodiment, the programmable ROM 20 and the power supply circuit block PB are adjacently disposed along the first direction D1, as shown in FIG. 3A. This allows adjustment data signal lines from the programmable ROM 20 to be connected with the power supply circuit block PB along a short path, whereby an increase in the chip area due to the wiring region can be prevented.

2.3. Other Types of User Setting Information

In the integrated circuit device according to this embodiment, the data stored in the programmable ROM 20 is not limited to the above data. For example, adjustment data for adjusting a given timing may be stored in the programmable ROM 20 as display driver adjustment data. Specifically, various control signals which control the refresh cycle of the memory or the display timing may be generated based on the adjustment data. Adjustment data for adjusting start sequence setting of the integrated circuit device may be stored in the programmable ROM 20 as the display driver adjustment data.

The above adjustment data is programmed by the user. Note that data adjusted by the IC manufacturer during IC manufacture/inspection may also be stored in the programmable ROM 20.

3. Programmable ROM 3.1. Entire Configuration of Programmable ROM

Figure 8:
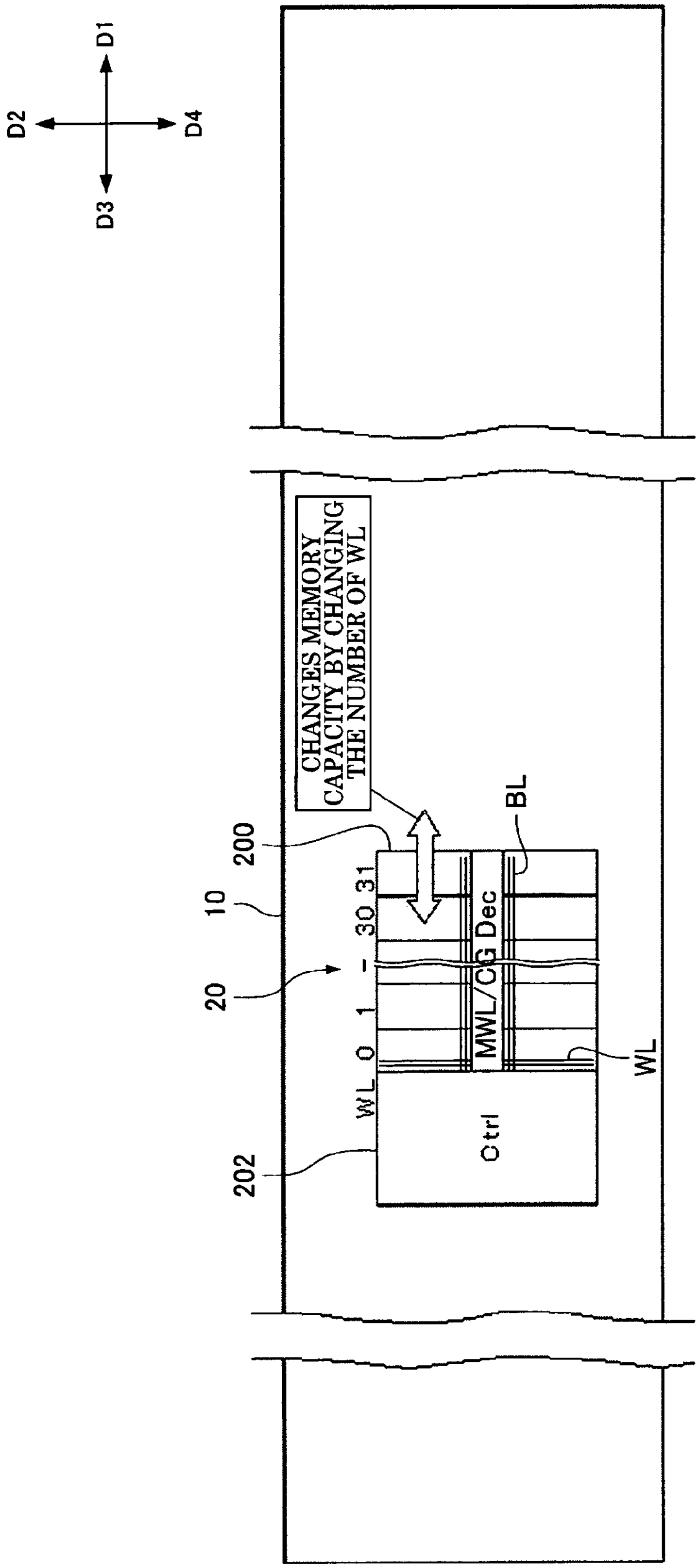
FIG. 8 is a view illustrating a layout of a programmable ROM block in an integrated circuit device.

FIG. 8 illustrates the programmable ROM 20 disposed in the integrated circuit device 10. The programmable ROM 20 includes a memory cell array block 200 and a control circuit block 202. The memory cell array block 200 and the control circuit block 202 are adjacently disposed along the direction D1 (long side direction) of the integrated circuit device 10.

A plurality of wordlines WL and a plurality of bitlines BL are provided in the memory cell array block 200. The wordlines WL extend along the direction D2 (short side direction) of the integrated circuit device 10. The bitlines BL extend along the direction D1 (long side direction) of the integrated circuit device 10. The reasons therefor are as follows.

The storage capacity of the programmable ROM 20 can be increased or decreased for each model depending on the user's specification and the like. In this embodiment, the storage capacity is increased or decreased by changing the number of wordlines WL. Specifically, the length of the wordline WL is not changed even if the storage capacity is changed. As a result, the number of memory cells connected with one wordline WL is fixed. The storage capacity of the programmable ROM 20 is increased by increasing the number of wordlines WL. Even if the storage capacity of the programmable ROM 20 is increased, the size of the memory cell array block 200 is not increased in the short side direction (direction D2) of the integrated circuit device 10. Therefore, a narrow shape described with reference to FIG. 1 can be maintained.

Figure 9:
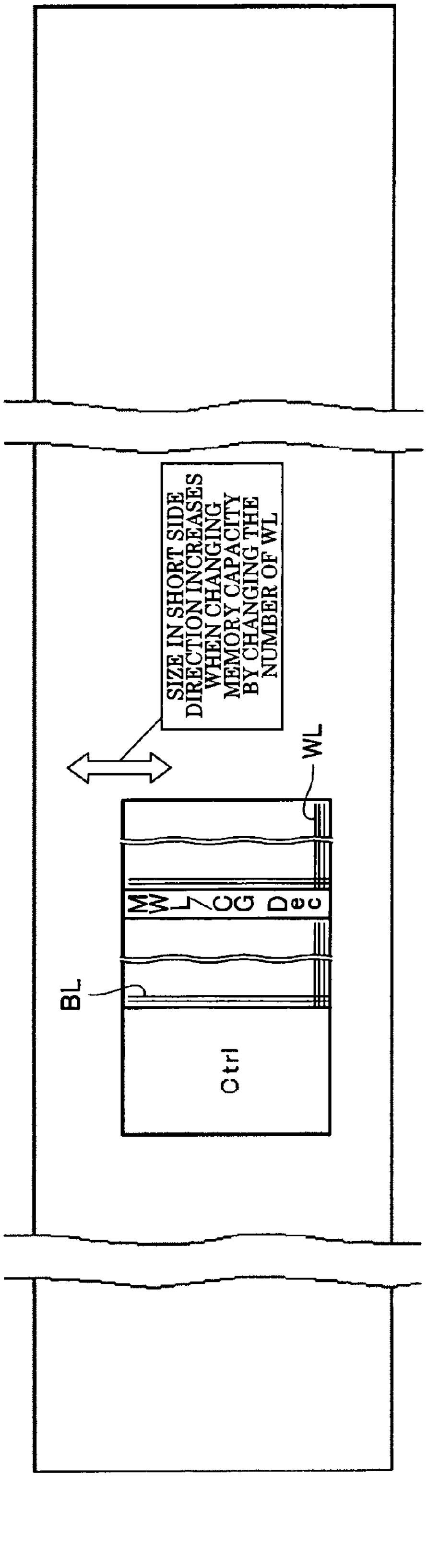
FIG. 9 is a view illustrating a layout of a comparative example of FIG. 8.

As another reason, even if the storage capacity of the programmable ROM 20 is increased, the size of the control circuit block 202 is not increased in the short side direction (direction D2) of the integrated circuit device 10. Therefore, a narrow shape described with reference to FIG. 1 can be maintained. In FIG. 9 which illustrates a comparative example, the size of the memory cell array block 200 is increased in the short side direction (direction D2) of the integrated circuit device 10 as a result of increasing the storage capacity of the programmable ROM 20. In this case, it is necessary to redesign the circuit of the control circuit block 202. On the other hand, redesign is unnecessary for the layout shown in FIG. 8 according to this embodiment, in which the layout shown in FIG. 9 (comparative example) is rotated by 90°. Therefore, even if the storage capacity of the programmable ROM 20 is increased or decreased, the design efficiency of the control circuit block 202 can be improved.

As yet another reason, since the bitlines BL extend along the direction D1 (long side direction) of the integrated circuit device 10, the control circuit block 202 can be disposed on the extension lines of the bitlines BL. One of the functions of the control circuit block 202 is to detect data read through the bitline BL using a sense amplifier and supply the data to another circuit block. According to the above layout, the data read from the memory cell array block 200 can be supplied to the control circuit block 202 along a short path in comparison with the comparative example shown in FIG. 9.

3.2. Single-layer Gate Memory Cell

Figure 10:
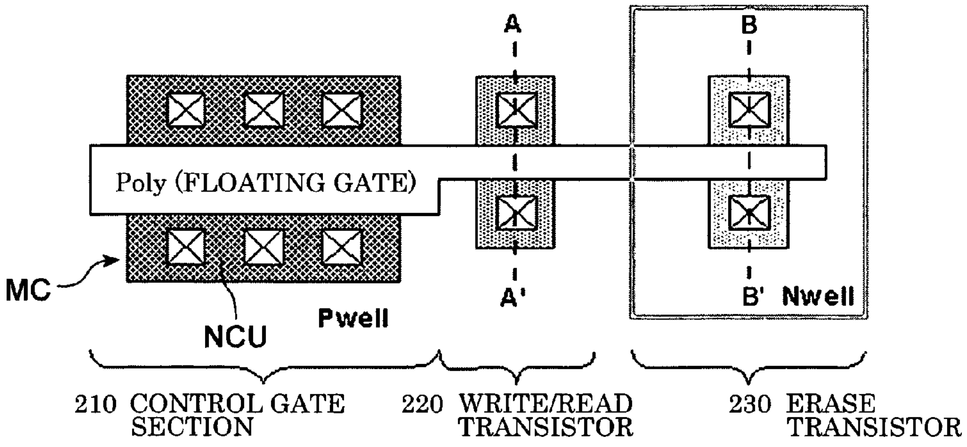
FIG. 10 is a plan view of a single-layer-gate memory cell disposed in a programmable ROM.
Figure 11:
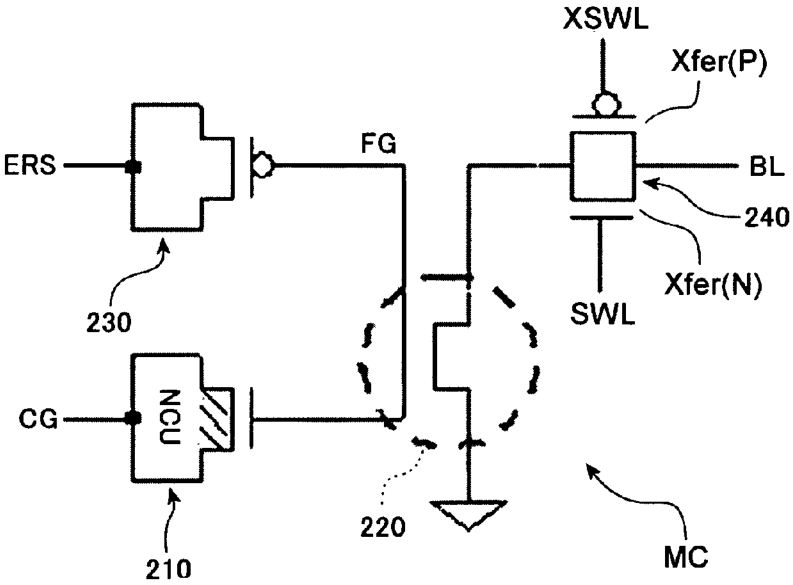
FIG. 11 is an equivalent circuit diagram of the memory cell shown in FIG. 10.

FIG. 10 is a plan view of a single-layer-gate memory cell MC disposed in the memory cell array block 200 shown in FIG. 8. FIG. 11 is an equivalent circuit diagram of the single-layer-gate memory cell MC.

In FIG. 10, the memory cell MC includes a control gate section 210, a write/read transistor 220, and an erase transistor 230. A floating gate FG formed of polysilicon extends over these regions. As shown in FIG. 11, the memory cell MC includes a transfer gate 240 provided between the drain of the write/read transistor 220 and the bitline BL. The transfer gate 240 connects/disconnects the drain of the write/read transistor 220 and the bitline BL based on the logic of a sub-wordline SWL and the logic of an inversion sub-wordline XSWL. The transfer gate 240 includes a P-type MOS transistor Xfer (P) and an N-type MOS transistor Xfer (N). When the wordline is not hierarchized, the transfer gate 240 is controlled based on the logic of the wordline and the inversion wordline.

The term "single-layer-gate" means that only the floating gate FG is formed of a polysilicon since a control gate CG is formed using an N-type (second conductivity type in a broad sense) impurity layer NCU formed in a P-type well PWEL in a semiconductor substrate (e.g. P-type; first conductivity type in a broad sense). Specifically, the two-layer gate of the control gate CG and the floating gate FG is not entirely formed using a polysilicon. A coupling capacitor is formed by the control gate CG and the floating gate FG opposite to the control gate CG The "single-layer-gate" structure according to this embodiment using only the floating gate differs from the related-art structure in that data is written and erased using MOS transistors of different channel conductivity types. An advantage obtained by writing and erasing data using different MOS transistors is as follows. Specifically, data is erased by applying a voltage to a portion with a small capacitive coupling and setting a portion with a large capacitive coupling at 0 V to remove electrons injected into the floating gate through a Fowler-Nordheim (FN) tunneling current. As a related-art single-layer-gate nonvolatile memory device, a nonvolatile memory device is known in which data is written and erased using a single MOS transistor (single portion). The single-layer-gate nonvolatile memory device is designed so that the capacitance of the write region is decreased since it is necessary to increase the capacitance between the control gate and the floating gate electrode in comparison with the capacitance of the write region. Specifically, when erasing data, it is necessary to apply a high erase voltage to a portion with a capacitive coupling.

However, a scaled-down nonvolatile memory device may not sufficiently withstand the voltage applied when erasing data, whereby the MOS transistor may be destroyed. Therefore, in the programmable ROM block according to this embodiment, data is written and erased using different MOS transistors which differ in channel conductivity type. When a P-channel MOS transistor is formed as the MOS transistor for erasing data, this MOS transistor is formed on an N-type well. Therefore, a voltage up to the junction breakdown voltage between the N-type well and the substrate (semiconductor layer) can be applied during erasing. As a result, tolerance to the erase voltage can be increased in comparison with the case of erasing data at the same location as the write region, thereby enabling scaling down and improving reliability.

The integrated circuit device 10 according to this embodiment includes a low voltage (LV) system (e.g. 1.8 V), a middle voltage (MV) system (e.g. 3 V), and a high voltage (HV) system (e.g. 20 V). The memory cell MC has an MV withstand structure. The write/read transistor 220 and the N-type MOS transistor Xfer (N) are MV N-type MOS transistors, and the erase transistor 230 and the P-type MOS transistor Xfer (P) are MV P-type MOS transistors.

Figure 12:
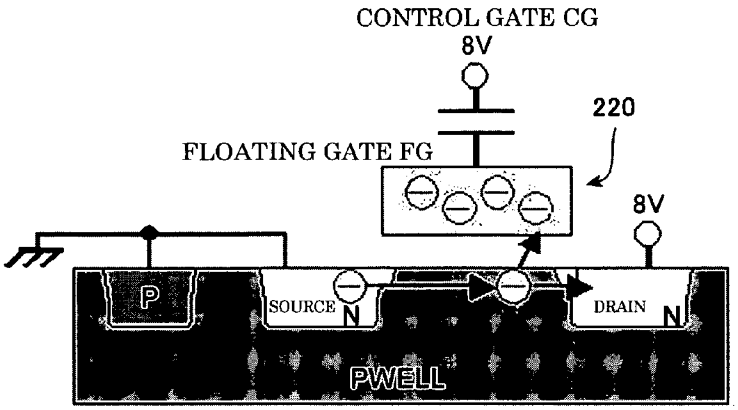
FIG. 12 is a cross-sectional view along the line A-A' in FIG. 10, illustrating the principle of programming (writing) data into a memory cell.
Figure 13:
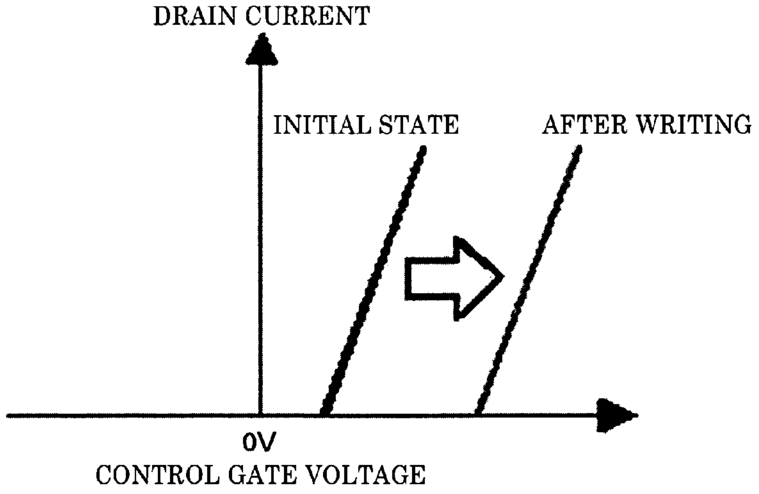
FIG. 13 is a view illustrative of a change in threshold value of a write/read transistor after programming.

FIG. 12 illustrates the operation of writing (programming) data into the memory cell MC. For example, 8 V is applied to the control gate CG, and 8 V is applied to the drain of the write transistor 220 through the bitline BL and the transfer gate 240. The potentials of the source of the write/read transistor 220 and the P-type well PWEL are 0 V. This causes hot electrons to be generated in the channel of the write/read transistor 220 and drawn into the floating gate of the write/read transistor 220. As a result, the threshold value Vth of the write/read transistor 220 becomes higher than that in the initial state, as shown in FIG. 13.

Figure 14:
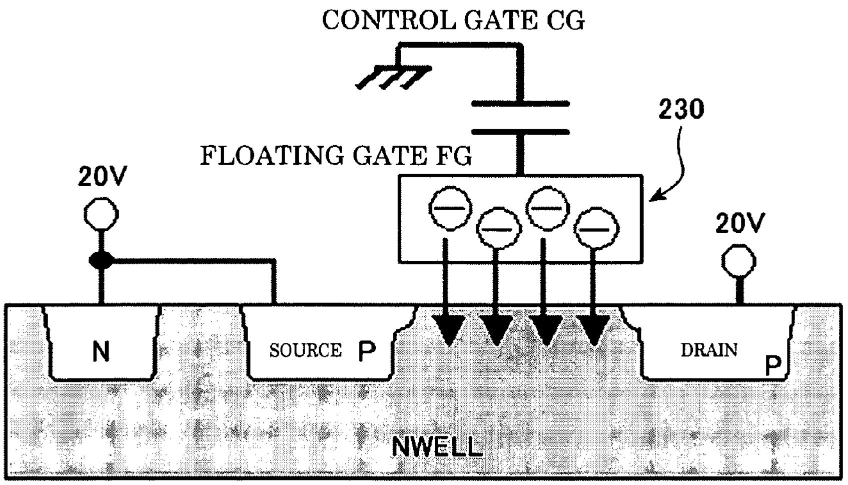
FIG. 14 is a cross-sectional view along the line B-B' in FIG. 10, illustrating the principle of erasing data in a memory cell.
Figure 15:
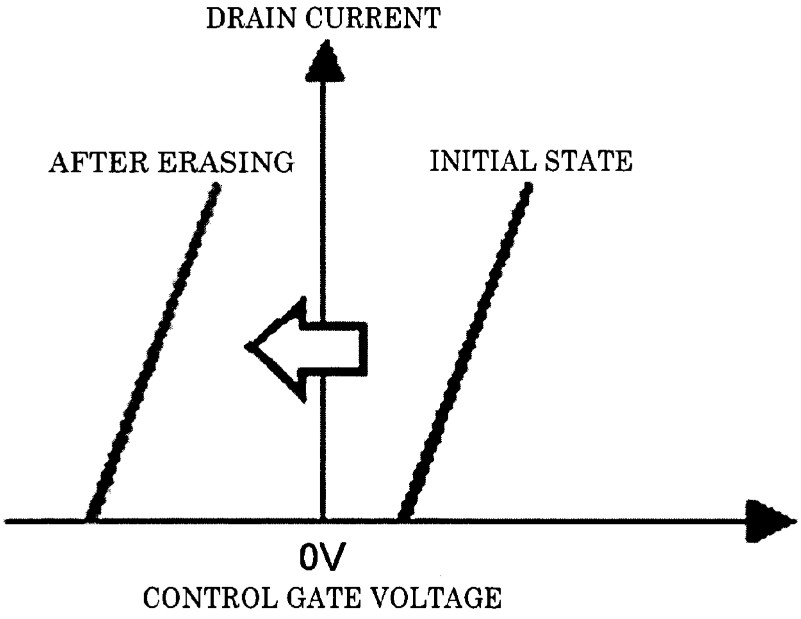
FIG. 15 is a view illustrative of a change in threshold value of a write/read transistor after erasing.

When erasing data, as shown in FIG. 14, 20 V is applied to the drain of the erase transistor 230, and the control gate CG is grounded, for example. The potentials of the source of the erase transistor 230 and the N-type well NWEL are 20 V, for example. This causes a high voltage to be applied between the control gate CG and the N-type well NWEL, whereby electrons in the floating gate FG are drawn into the N-type well NWEL. The data is erased by this FN tunneling current. In this case, the threshold value Vth of the write/read transistor 220 becomes a negative value lower than that in the initial state, as shown in FIG. 15.

Figure 16:
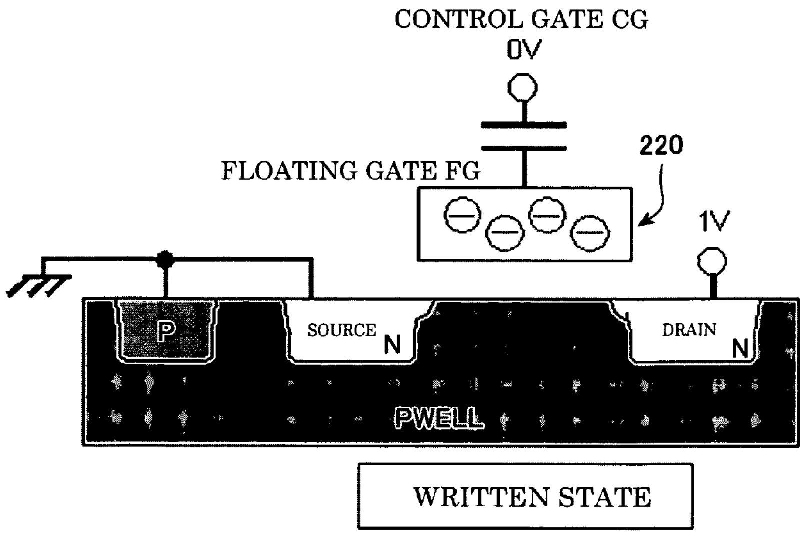
FIG. 16 is a cross-sectional view along the line A-A' in FIG. 10, illustrating the principle of reading data from a memory cell in a written state.
Figure 17:
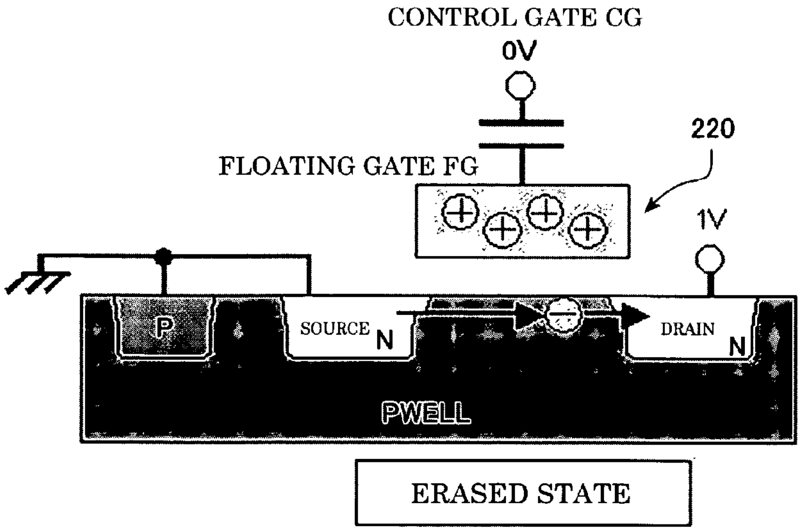
FIG. 17 is a cross-sectional view along the line A-A' in FIG. 10, illustrating the principle of reading data from a memory cell in an erased state.

When reading data, as shown in FIGS. 16 and 17, the control gate CG is grounded, and 1 V is applied to the drain of the write/read transistor 220, for example. The potentials of the source of the write/read transistor 220 and the P-type well PWEL are 0 V. In the written state shown in FIG. 16, since the floating gate FG contains excess electrons, current does not flow through the channel. In the erased state shown in FIG. 17, since the floating gate FG contains excess holes, current flows through the channel. The data can be read by detecting the presence or absence of current.

The programmable ROM 20 according to this embodiment is mainly used as a nonvolatile memory in which the user stores the adjustment data instead of a related-art $E^2$PROM or a trimmer resistor, or the IC manufacturer stores the adjustment data during manufacture/inspection, as described above. Therefore, it suffices that data can be rewritten about five times.

3.3. Memory Cell Array Block 3.3.1. Planar Layout

Figure 18:
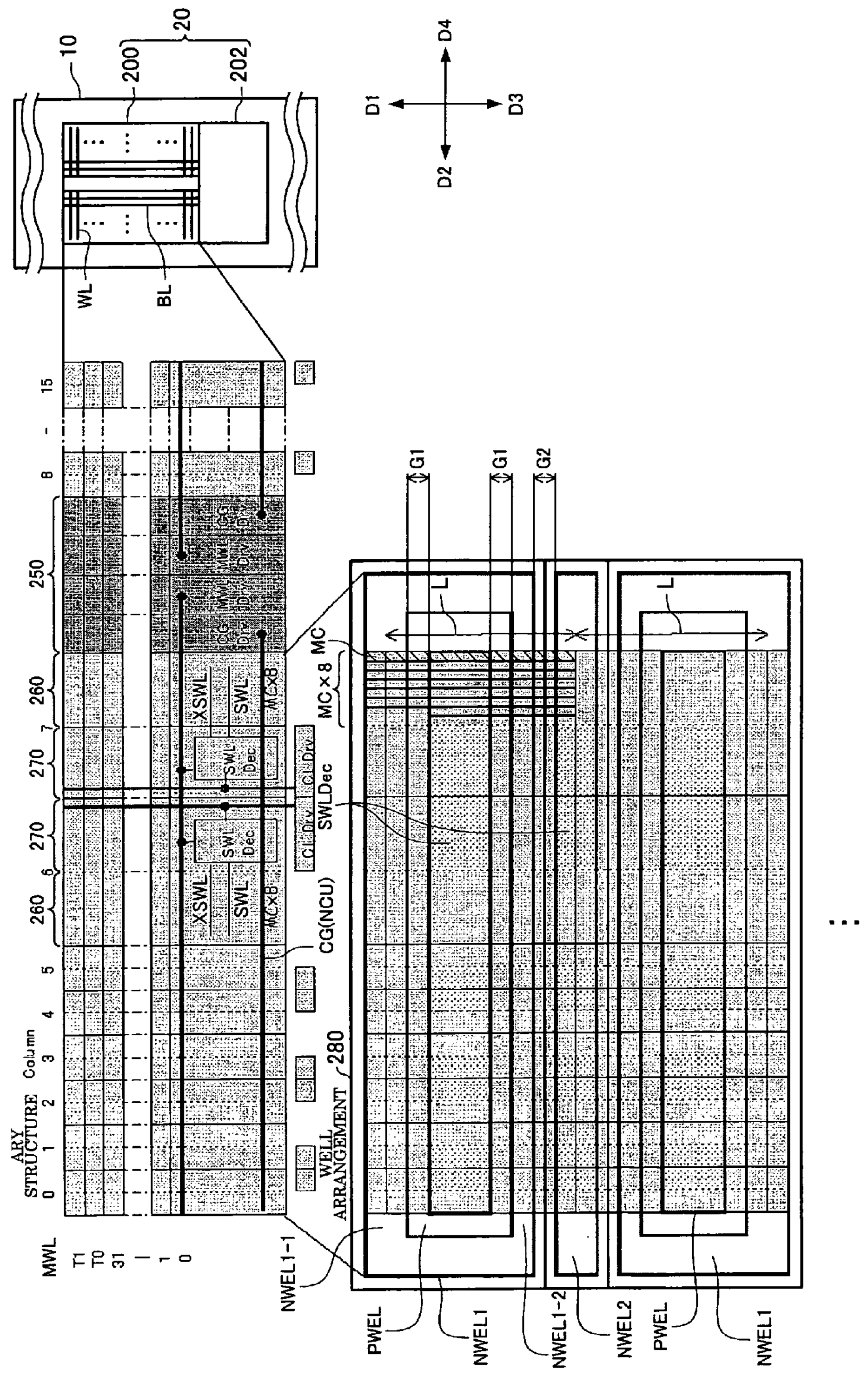
FIG. 18 is a plan view of a memory cell array block of a programmable ROM.

FIG. 18 is an enlarged plan view illustrating the memory cell array block 200 and part of the memory cell array block 200. In the memory cell array block 200, a formation region 250 of a main-wordline driver MWLDrv and a control gate line driver CGDrv is provided at the center in the short side direction (direction D2) of the integrated circuit device 10. The memory cell array block 200 is divided into first and second regions on either side of the formation region 250. In this embodiment, eight column blocks are provided in each of the first and second regions so that sixteen column blocks 0 to 15 are provided in total. Eight memory cells MC are disposed in one column block along the direction D2. In this embodiment, the length W of the short side of the integrated circuit device 10 shown in 3A is 800 μm, and the number of memory cells MC which can be arranged within the length W is determined to be "16 columns×8 memory cells" based on the length of one memory cell MC in the direction D2. The storage capacity of the programmable ROM 20 may be increased or decreased by increasing or decreasing the number of wordlines. The main-wordline driver MWLDrv and the control gate line driver CGDrv are provided for each region formed by dividing the memory cell array block 200 in two regions (i.e. two main-wordline drivers MWLDrv and two control gate line drivers CGDrv are provided in the memory cell array block 200). The main-wordline driver MWLDrv and the control gate line driver CGDrv may be provided on the end of the memory array block 200.

In FIG. 18, the total number of main-wordlines MWL driven by one main-wordline driver MWLDrv is 34. Two of the main-wordlines MWL are test main-wordlines T1 and T0 connected with test-bit memory cells for the IC manufacturer, and the remaining 32 main-wordlines MWL are main-wordlines MWL0 to MWL31 for the user. The control gate line CG (N-type impurity layer NCU shown in FIG. 10) driven by one control gate line driver CGDrv extends in parallel to the main-wordline MWL.

Each of the 16 column blocks 0 to 15 includes a memory cell region 260 and a sub-wordline decoder region 270. A sub-wordline decoder SWLDec connected with each main-wordline MWL is provided in the sub-wordline decoder region 270. A column driver CLDrv is provided in the region of the control circuit block 202 in units of the sub-wordline decoder regions 270. The output line of the column driver CLDrv is connected in common with all the sub-wordline decoders SWLDec disposed in each sub-wordline decoder region 270.

The sub-wordline SWL and the inversion sub-wordline XSWL extend from one sub-wordline decoder SWLDec toward the adjacent memory cell region 260. In one column block, eight memory cells MC connected in common with the sub-wordline SWL and the inversion sub-wordline XSWL are disposed in the memory cell region 260, for example.

In the layout shown in FIG. 18, one sub-wordline decoder SWLDec is selected when one main-wordline MWL is selected by the main-wordline driver MWLDrv and one column block is selected by the column decoder CLDrv. The eight memory cells MC connected with the selected sub-wordline decoder SWLDec are selected, and data is programmed (written) into or read from the selected memory cells.

3.3.2. Well Layout of Memory Cell Region and Sub-wordline Decoder Region

FIG. 18 illustrates a well layout common to the memory cell region 260 and the sub-wordline decoder region 270. Three wells are used to form one memory cell MC in the memory cell region 260. The three wells include a P-type well PWEL (shallow well of the first conductivity type in a broad sense) which extends in the direction (direction D2) along the main-wordline MWL, a ring-shaped N-type well NWEL1 (ring-shaped shallow well of the second conductivity type in a broad sense) which encloses the P-type well PWEL, and a beltlike N-type well NWEL2 (beltlike shallow well of the second conductivity type in a broad sense) which extends in the direction (direction D2) along the main-wordline MWL on the side of the ring-shaped N-type well NWEL1. One of the long side regions of the ring-shaped N-type well NWEL1 is called NWEL1-1, and the other long side region (NWEL2 side) is called NWEL1-2.

One memory cell MC is formed on the three wells (PWEL, NWEL1, and NWEL2) over the length region L of one memory cell shown in FIG. 18. Eight memory cells MC connected in common with one sub-wordline decoder SWLDec are formed in the length region L in each memory cell region 260, as shown in FIG. 18.

In FIG. 18, a P-type impurity ring 280 (impurity ring of the first conductivity type in a broad sense) which encloses the ring-shaped N-type well NWEL1 and the beltlike N-type well NWEL2 is provided. The P-type impurity ring 280 is described later.

In FIG. 18, the above three wells (PWEL, NWEL1, and NWEL2) are also formed in the sub-wordline decoder region 270. Note that transistors forming the sub-wordline decoder SWLDec are formed on the P-type well PWEL and the beltlike N-type well NWEL2 indicated as dot regions in FIG. 18, but are not formed on the ring-shaped N-type well NWEL1.

3.3.3. Planar Layout and Cross-sectional Structure of Memory Cell

Figure 19:
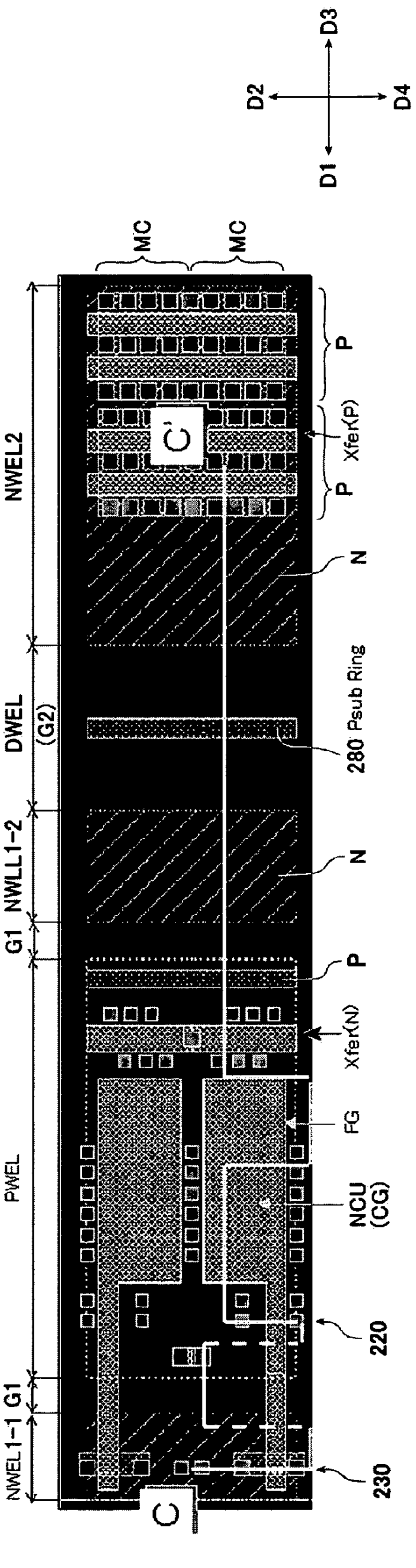
FIG. 19 is a plan view of two adjacent memory cells.
Figure 20:
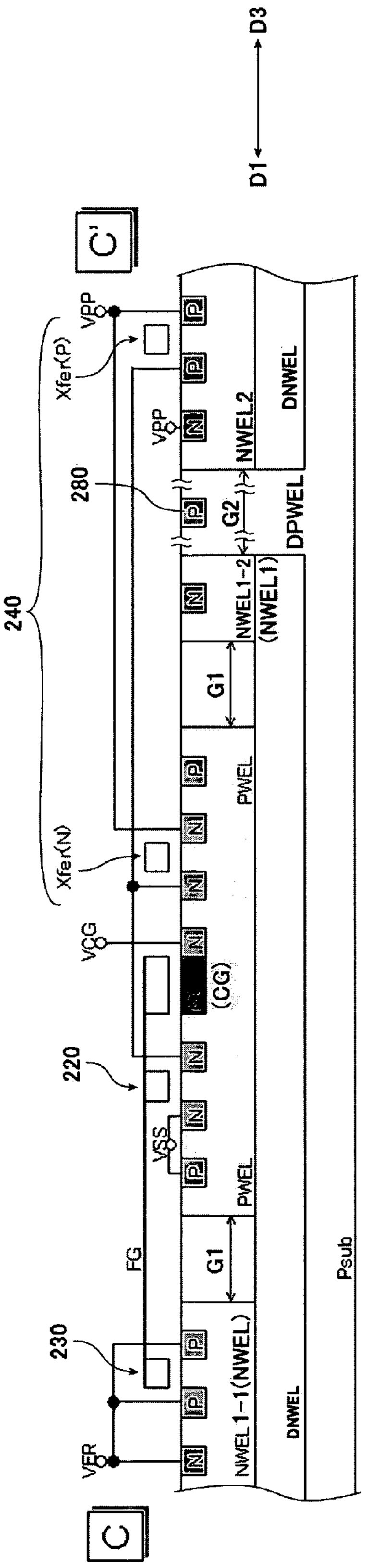
FIG. 20 is a cross-sectional view along the line C-C' in FIG. 19.

FIG. 19 illustrates a planar layout of two memory cells MC adjacent in FIG. 18. FIG. 20 is a cross-sectional view of one memory cell MC along the line C-C' in FIG. 19. The cross section along the line C-C' in FIG. 19 indicated by the broken lines in the direction D2 is omitted in FIG. 20. Note that the dimensions in the direction D1 along the line C-C' in FIG. 19 do not necessarily coincide with the dimensions in the direction D1 in FIG. 20.

In FIG. 19, two memory cells MC are disposed in a mirror image when viewed from the top side. As shown in FIG. 19, the memory cell MC is formed over the three wells (PWEL, NWEL1, and NWEL2), as described above. As shown in FIG. 20, a deep N-type well DNWEL (deep well of the second conductivity type in a broad sense) is provided in the lower layer of the ring-shaped N-type well NWEL1 inside the outer edge thereof and the lower layer of the beltlike N-type well NWEL2. As shown in FIG. 20, since a P-type or N-type impurity region (top impurity region in a broad sense) is provided in the three wells (PWEL, NWEL1, and NWEL2) on the deep N-type well DNWEL, the memory cell MC according to this embodiment has a triple-well structure. This allows the P-type substrate Psub and the P-type well PWEL to be set at different potentials. Since not only the programmable ROM 20, but also other circuit blocks are formed on the P-type substrate Psub, it is necessary to apply a backgate voltage or the like. Therefore, the potential of the P-type substrate Psub is not necessarily fixed at a ground potential.

As shown in FIGS. 19 and 20, the polysilicon floating gate FG is formed in the upper layer of the long side region NWEL1-1 of the ring-shaped N-type well NWEL1 and the P-type well PWEL through an insulating film (not shown). The floating gate FG functions as a common gate of the write/read transistor 220 formed in the P-type well PWEL and the erase transistor 230 formed in the long side region NWEL1-1 of the ring-shaped N-type well NWEL1. An N-type impurity region NCU is formed in the P-type well PWEL opposite to the floating gate FG through the insulating film. The N-type impurity region NCU is provided with the control gate voltage VCG and functions as the control gate CG.

The N-type MOS transistor Xfer (N) of the transfer gate 240 shown in FIG. 11 is provided in the P-type well PWEL. The P-type MOS transistor Xfer (P) of the transfer gate 240 is provided in the beltlike N-type well NWEL2. As shown in FIG. 19, the gate width is ensured by connecting the P-type MOS transistors Xfer (P) in parallel to provide a drive capability.

The N-type impurity region is provided in the long side region NWEL1-2 of the ring-shaped N-type well NWEL1, but an active element is not provided in the long side region NWEL1-2. The long side region NWEL1-2 is merely connected with the long side region NWEL1-1 to enclose the P-type well PWEL in the shape of a ring. If the long side region NWEL1-2 is not formed, the P-type well PWEL cannot be electrically separated from the P-type substrate Psub, even if the deep N-type well DNWEL is disposed.

In this embodiment, the P-type well PWEL is separated from the ring-shaped N-type well NWEL1 disposed outside the P-type well PWEL in the upper layer of the deep N-type well DNWEL. A space G1 is provided to withstand a voltage of 20 V applied between the ring-shaped N-type well NWEL1, to which 20 V is applied during erasing, and the P-type well PWEL which is set at the potential VSS. In this embodiment, the width of the space G1 is set at 1 μm. Note that the space G1 is unnecessary when it is possible to withstand the voltage applied between the ring-shaped N-type well NWEL1 and the P-type well PWEL. For example, when the design rule is 0.25 μm, the space G1 is unnecessary. When the design rule is 0.18 μm, the space G1 may be provided to ensure the withstand voltage.

A space G2 is also provided between the ring-shaped N-type well NWEL1 and the beltlike N-type well NWEL2. The deep N-type well DNWEL is not disposed in the region of the space G2 in order to electrically separate the ring-shaped N-type well NWEL1 from the beltlike N-type well NWEL2. A deep P-type well DPWEL (ring-shaped deep well of the first conductivity type in a broad sense) is formed in the region of the space G2 instead of the deep N-type well DNWEL. The deep P-type well DPWEL has an impurity concentration higher to some extent than that of the P-type substrate Psb and lower than that of the shallow P-type well PWEL, and is provided to increase the withstand voltage between the ring-shaped N-type well NWEL1 and the beltlike N-type well NWEL2. The deep P-type well DPWEL is disposed in the shape of a ring to enclose the ring-shaped N-type well NWEL1 and the beltlike N-type well NWEL2 in FIG. 18.

In this embodiment, the P-type impurity layer (P-type ring; impurity ring of the first conductivity type in a broad sense) is disposed in the top layer of the space G2 in the shape of a ring when viewed from the top side. The formation region of the P-type ring 280 encloses the ring-shaped N-type well NWEL1 and the beltlike N-type well NWEL2, as shown in FIG. 18.

Even if a metal interconnect which may serve as the gate of a parasitic transistor extends over the space G2, the parasitic transistor is not turned ON due to the P-type ring 280, whereby the potential of the space G2 is prevented from being reversed. In this embodiment, the width of the space G2 is set at 4.5 μm, and the width of the P-type ring 280 positioned at the center of the space G2 is set at 0.5 μm. In this embodiment, a polysilicon layer or a first-layer metal interconnect which may serve as the gate of the parasitic transistor is formed not to extend over the space G2 in order to prevent potential reversal. A second or higher layer metal interconnect may extend over the space G2.

Figure 21:
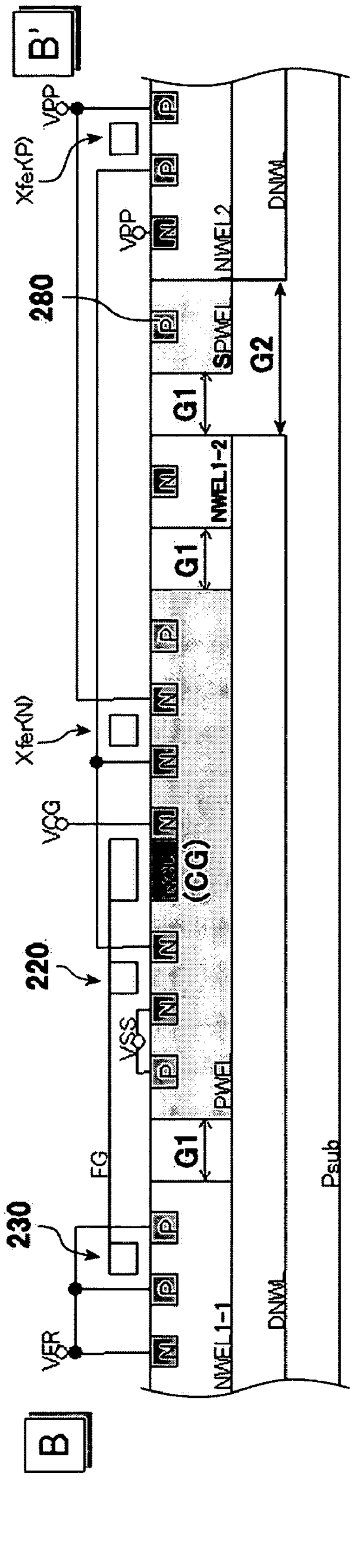
FIG. 21 is a view illustrating a modification of FIG. 20.

FIG. 21 illustrates a modification of FIG. 20. In FIG. 21, a ring-shaped shallow P-type well SPWEL (ring-shaped shallow well of the first conductivity type in a broad sense) is provided in the space G2 without providing the ring-shaped deep P-type well DPWEL. The P-type ring 280 is formed in the ring-shaped shallow P-type well SPWEL. The space G1 (e.g. 1 μm) between the long side region NWEL1-1 of the ring-shaped N-type well NWEL1 and the shallow P-type well SPWEL is provided in order to withstand a voltage of 20V for the above-described reason.

3.3.4. Control Circuit Block

Figure 22:
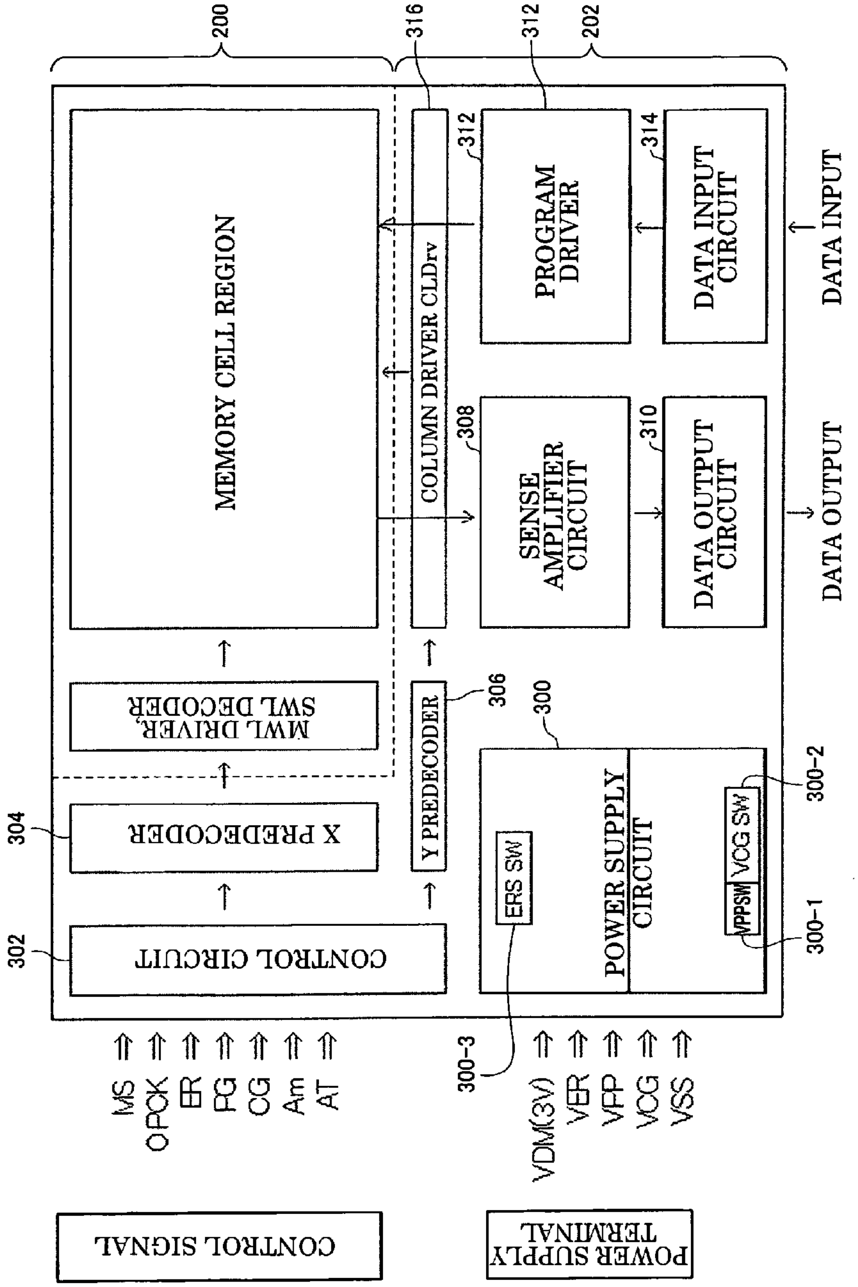
FIG. 22 is a block diagram of a programmable ROM.
Figure 23:
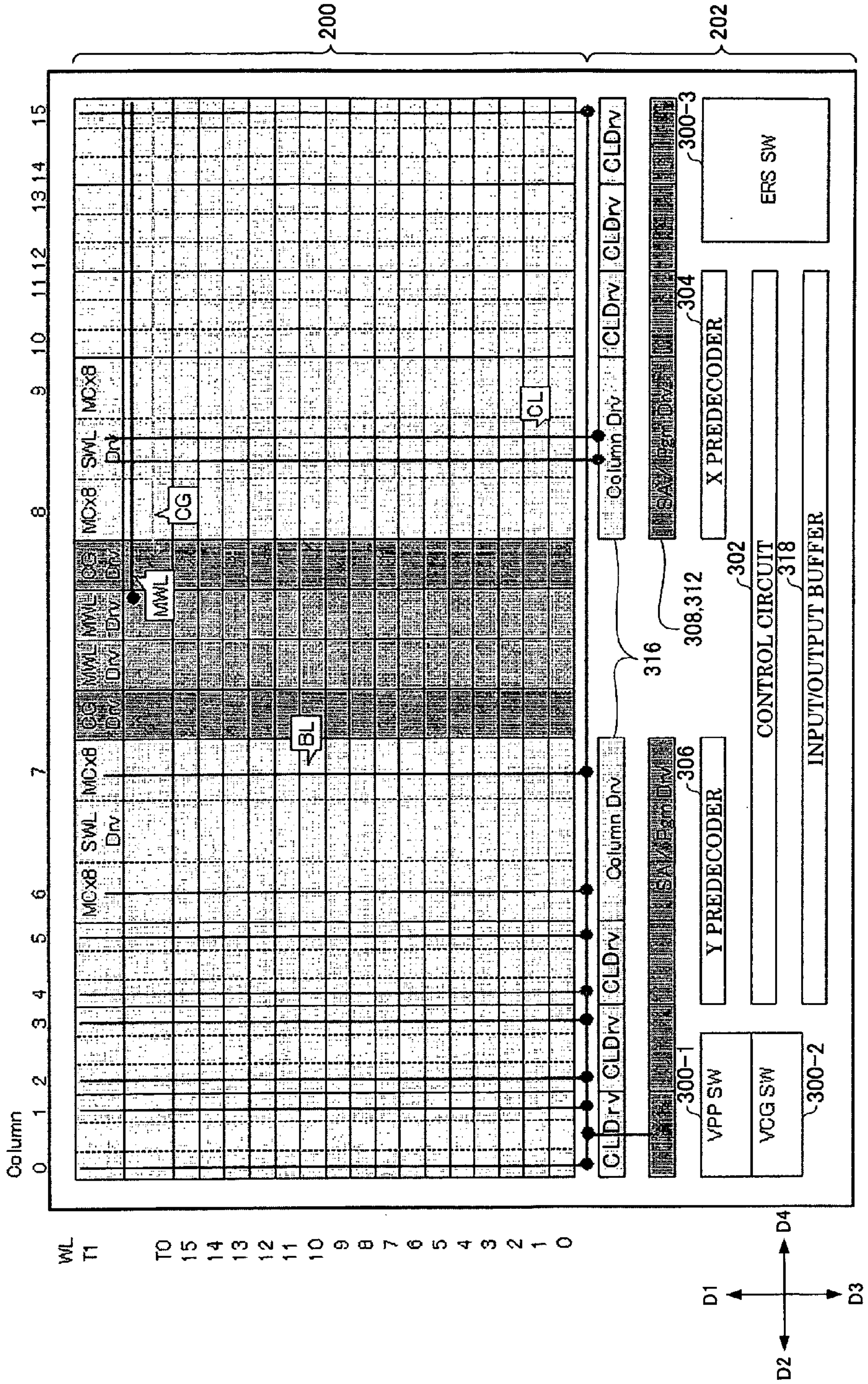
FIG. 23 is a view illustrating a planar layout of the entire programmable ROM.

The control circuit block 202 shown in FIG. 8 is described below. FIG. 22 is a block diagram of the control circuit block 202, and FIG. 23 is a layout diagram of the control circuit block 202. The control circuit block 202 is a circuit block for controlling data programming (writing), reading, and erasing of the memory cell MC in the memory cell array block 200. As shown in FIG. 22, the control circuit block 202 includes a power supply circuit 300, a control circuit 302, an X predecoder 304, a Y predecoder 306, a sense amplifier circuit 308, a data output circuit 310, a program driver 312, a data input circuit 314, and the above-described column driver 316 (CLDrv). An input/output buffer 318 shown in FIG. 23 includes the data output circuit 310 and the data input circuit 314 shown in FIG. 22. The power supply circuit 300 includes a VPP switch 300-1, a VCG switch 300-2, and an ERS (erase) switch 300-3.

As shown in FIG. 23, the memory cell array block 200 and the control circuit block 202 are adjacent along the direction D1. Data read from the memory cell array block 200 is output along the direction (direction D1) in which the bitline BL of the memory cell array block 200 extends through the control circuit block 202 and the input/output buffer 318 in the control circuit block 202.

As described with reference to FIGS. 3A and 3B, the programmable ROM 20 is disposed adjacent to the logic circuit block LB or the power supply circuit block PB (data transfer destination) along the direction D1. When the control circuit block 202 of the programmable ROM 20 is disposed adjacent to the logic circuit block LB or the power supply circuit block PB (data transfer destination) along the direction D1, data can be supplied along a shorter path.

4. Electronic Instrument

Figure 24A:
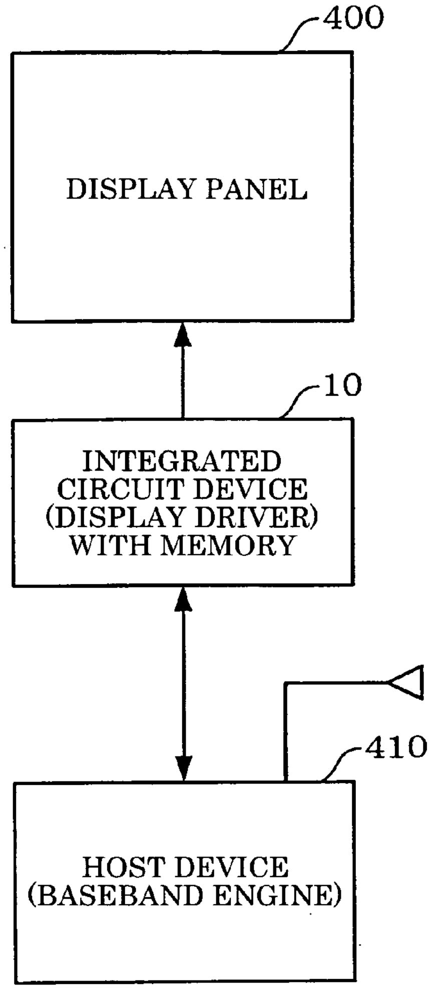
FIGS. 24A and 24B are views illustrating configuration examples of an electronic instrument.
Figure 24B:
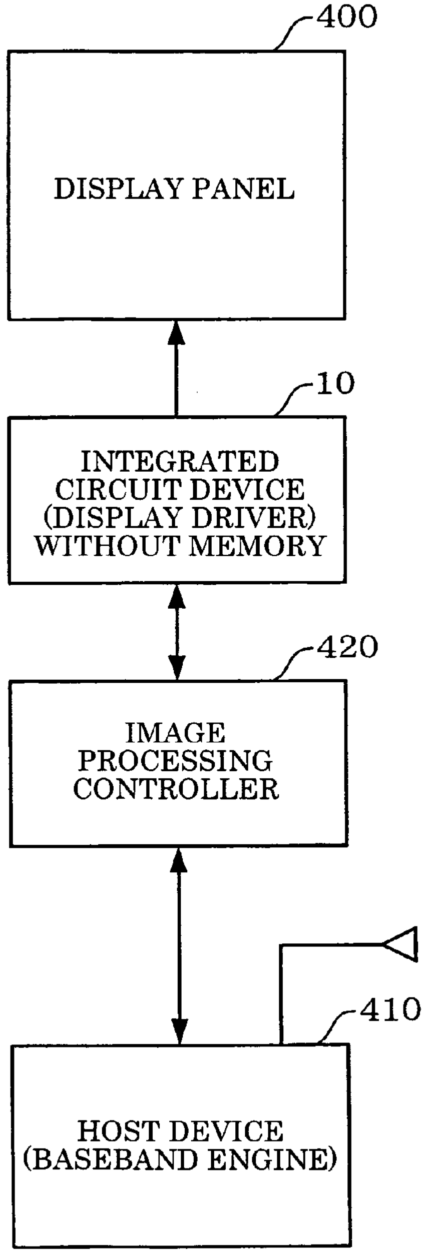

FIGS. 24A and 24B illustrate examples of an electronic instrument (electro-optical device) including the integrated circuit device 10 according to the above embodiment. The electronic instrument may include elements (e.g. camera, operation section, or power supply) other than the elements shown in FIGS. 24A and 24B. The electronic instrument according to this embodiment is not limited to a portable telephone, but may be a digital camera, PDA, electronic notebook, electronic dictionary, projector, rear-projection television, portable information terminal, or the like.

In FIGS. 24A and 24B, a host device 410 is a microprocessor unit (MPU), a baseband engine (baseband processor), or the like. The host device 410 controls the integrated circuit device 10 as a display driver. The host device 410 may also perform processing of an application engine or a baseband engine, or processing of a graphic engine such as compression, decompression, and sizing. An image processing controller (display controller) 420 shown in FIG. 24B performs processing of a graphic engine, such as compression, decompression, or sizing, instead of the host device 410.

A display panel 400 includes a plurality of data lines (source lines), a plurality of scan lines (gate lines), and a plurality of pixels specified by the data lines and the scan lines. The display operation is realized by changing the optical properties of an electro-optical element (liquid crystal element in a narrow sense) in each pixel region. The display panel 400 may be formed of an active matrix type panel using a switching element such as a TFT or TFD. The display panel 400 may be a panel other than an active matrix type panel, or may be a panel other than a liquid crystal panel.

In FIG. 24A, an integrated circuit device including a memory may be used as the integrated circuit device 10. In this case, the integrated circuit device 10 writes image data from the host device 410 into the built-in memory, and reads the written image data from the built-in memory to drive the display panel. In FIG. 24B, an integrated circuit device which does not include a memory may be used as the integrated circuit device 10. In this case, image data from the host device 410 is written into a memory provided in the image processing controller 420. The integrated circuit device 10 drives the display panel 400 under control of the image processing controller 420.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g. output-side I/F region and input-side I/F region) cited with a different term (e.g. first interface region and second interface region) having a broader meaning or the same meaning at least once in the specification and the drawings can be replaced by the different term in any place in the specification and the drawings. The configuration, arrangement, and operation of the integrated circuit device and the electronic instrument are not limited to those described in the above embodiments. Various modifications and variations may be made.

In the invention, the memory cell MC forming the programmable ROM may have a single-layer-gate structure in which a well is used instead of the impurity layer NCU, for example. Note that the memory cell MC may have a two-layer-gate structure instead of the single-layer-gate structure.

The first conductivity type of the semiconductor substrate provided with the programmable ROM may be an N-type.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A display driver having a semiconductor substrate and a rectangular outline in a plan view as seen from a direction perpendicular to the semiconductor substrate comprising:

first to Nth circuit blocks (N is an integer of two or more) disposed along a first direction when a direction from a first side that is a short side of the rectangular outline toward a third side opposite to the first side is a first direction and a direction from a second side that is a long side of the rectangular outline toward a fourth side opposite to the second side is a second direction;

a first interface region disposed on the second direction side of the first to Nth circuit blocks and extending along the fourth side, the first interface region including a plurality of pads; and a second interface region disposed on the side of the first to Nth circuit blocks opposite to the second direction and extending along the second side, the second interface region including a plurality of pads, a circuit element being disposed under one of the plurality of second pads, when a width of the display driver in the second direction being W, a width of the first interface region in the second direction being W1, a width of the second interface region in the second direction being W2, and a maximum width of the first to Nth circuit blocks in the second direction being WB, $W1+WB+W2 \leqq W < W1+2\times WB+W2$ being satisfied, a first circuit block of the first to Nth circuit blocks being a logic circuit block, a second circuit block of the first to Nth circuit blocks being a programmable ROM block which includes a plurality of memory cells and stores adjustment data, the logic circuit block and the programmable ROM block being adjacently disposed along the first direction, the adjustment data stored in the programmable ROM block being supplied to the logic circuit block, and another circuit block other than the first to Nth circuit blocks not being provided between the second interface region and one of the logic circuit block and the programmable ROM block in the second direction.

2. The display driver according to claim 1, a third circuit block of the first to Nth circuit blocks being a display memory block which stores display data.

3. The display driver according to claim 2, the first interface region including a plurality of output transistors and a plurality of protective elements.

4. The display driver according to claim 3, a width of the logic circuit block in the second direction being substantially equal to a width of the programmable ROM block in the second direction.

5. The display driver according to claim 3, the programmable ROM block including a plurality of wordlines extending along the second direction and a plurality of bitlines extending along the first direction.

6. The display driver according to claim 3, a circuit element being disposed under the pads.

7. The display driver according to claim 3, a fourth circuit block of the first to Nth circuit blocks being a data driver which is disposed adjacent to the display memory.

8. An electronic instrument comprising:

the display driver according to claim 1; and a display panel driven by the display driver.

9. The display driver according to claim 1, wherein a ratio between a length of the display driver in the first direction and the width of the display driver in the second direction is greater than 10.

* * * * *